June 15, 1965    K. H. ARNING    3,189,118
VEHICLE REAR WHEEL SUSPENSION
Filed March 29, 1961    10 Sheets-Sheet 1

FRONT OF CAR

K. H. ARNING
INVENTOR.

BY E. C. McRae
J. C. Faulkner
T. H. Oster

ATTORNEYS

June 15, 1965  K. H. ARNING  3,189,118
VEHICLE REAR WHEEL SUSPENSION
Filed March 29, 1961  10 Sheets-Sheet 2

K. H. ARNING
INVENTOR.

BY C.C. McRae
J.R. Faulkner
J.H. Oster

ATTORNEYS

June 15, 1965     K. H. ARNING     3,189,118
VEHICLE REAR WHEEL SUSPENSION
Filed March 29, 1961     10 Sheets-Sheet 3

K. H. ARNING
INVENTOR.

BY E. C. McRae
J. R. Faulkner
J. H. Oster

ATTORNEYS

June 15, 1965  K. H. ARNING  3,189,118
VEHICLE REAR WHEEL SUSPENSION
Filed March 29, 1961  10 Sheets-Sheet 5

K. H. ARNING
INVENTOR.

BY *E.C. McRae*
*J.R. Faulkner*
*T.H. Oster*

ATTORNEYS

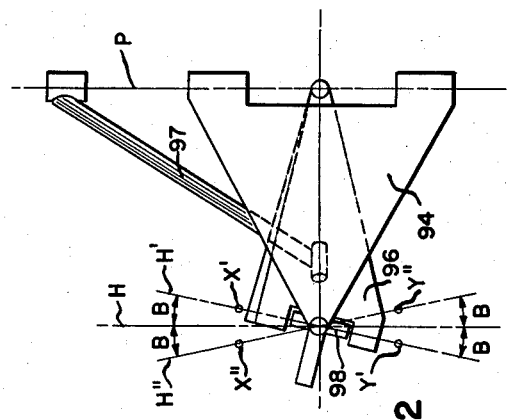
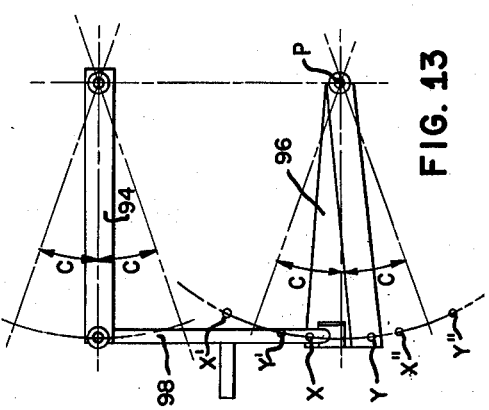
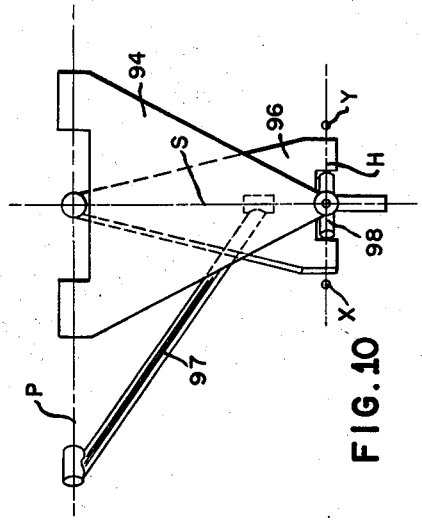
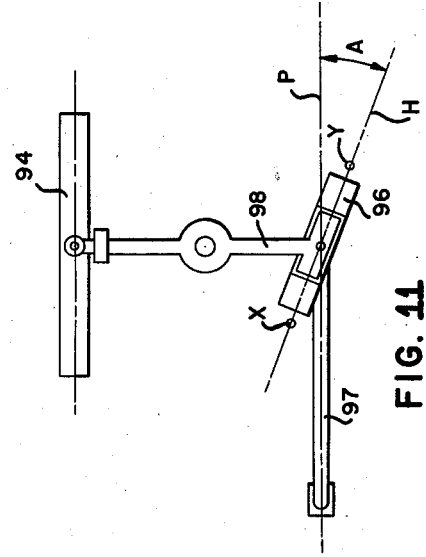

June 15, 1965  K. H. ARNING  3,189,118
VEHICLE REAR WHEEL SUSPENSION
Filed March 29, 1961  10 Sheets-Sheet 7

KLAUS H. ARNING
INVENTOR.

BY John R. Faulkner
Thomas H. Oster

ATTORNEYS

June 15, 1965 K. H. ARNING 3,189,118
VEHICLE REAR WHEEL SUSPENSION
Filed March 29, 1961 10 Sheets-Sheet 8

KLAUS H. ARNING
INVENTOR.

BY
ATTORNEYS

KLAUS H. ARNING
INVENTOR.

ATTORNEYS

FRONT OF CAR

FRONT OF CAR

KLAUS H. ARNING
INVENTOR.

BY
ATTORNEYS

United States Patent Office 3,189,118
Patented June 15, 1965

3,189,118
VEHICLE REAR WHEEL SUSPENSION
Klaus H. Arning, Detroit, Mich., assignor to Ford Motor Company, Dearborn, Mich., a corporation of Delaware
Filed Mar. 29, 1961, Ser. No. 99,167
59 Claims. (Cl. 180—73)

This invention relates generally to a motor vehicle, and more particularly to a rear wheel independent suspension for a motor vehicle.

This application is a continuation-in-part of my copending application Serial No. 720,347, filed March 10, 1958, entitled "Vehicle Rear Wheel Suspension," and my copending application Serial No. 827,872, filed July 17, 1959, entitled "Vehicle Rear Wheel Suspension," each of which has since become abandoned.

A desirable characteristic of a motor vehicle rear suspension is the ability of the suspension to counteract the tendency of the rear portion of the vehicle to squat during acceleration and to lift during braking. It is also desirable to introduce into the suspension a predetermined amount of roll understeer to afford proper control and precise handling characteristics during cornering. With the usual type of rear suspension, however, these characteristics are incompatible and cannot be simultaneously obtained in a single design. It is, therefore, an object of the present invention to provide a motor vehicle rear wheel suspension capable of achieving roll understeer and at the same time having anti-squat and anti-lift characteristics during acceleration and braking respectively.

During acceleration the transfer of vehicle weight rearwardly tends to cause the rearward portion of the vehicle to squat and the wheels to move in a jounce direction. Conversely, during braking the transfer of weight forwardly causes the rearward portion of the vehicle to lift and the wheels to move in a rebound direction. It is known in the art to counteract these undesirable characteristics by a suspension geometry such that the rear wheels will recede or move rearwardly in jounce and forwardly in rebound. Thus, by providing a certain wheel path, anti-squat and anti-lift forces may be provided to at least partially counteract acceleration squat and brake lift. This path, however, is necessarily such as to result in oversteer during cornering rather than the desired understeer. To produce understeer it is necessary that the outer rear wheel on a curve, which wheel is in jounce due to the centrifugal force acting upon the vehicle body, move forwardly or toe in to steer the rearward portion of the vehicle in the direction in which the front wheels are turned. At the same time the inner wheel on the curve, which wheel moves in rebound, should move rearwardly or toe out for understeer. It will thus be seen that normally understeer is inconsistent with anti-squat and anti-lift. The present invention, however, makes it possible to achieve all of these desirable characteristics and accomplishes this by a suspension structure which provides roll steer independently of the wheel path, thus making it possible to combine into a single suspension the desired amount of roll understeer as well as the desired amount of anti-squat and anti-lift.

In one embodiment of the invention this is accomplished in a rear suspension of the type having upper and lower generally transversely extending suspension members connected between the vehicle frame and the wheel spindle support. One of these suspension members is a composite type member comprising two interconnected but relatively movable arms. This composite suspension member is pivotally supported upon the vehicle frame for swinging movement about a primary axis, and one of its arms is pivotally connected to the wheel spindle support about a generally longitudinally extending hinge axis which is inclined with respect to the said primary axis as viewed in the side elevation of the vehicle. The primary and hinge axes may also be inclined with respect to each other when viewed in plan view. The geometry established by the angular relation of these two axes determines the amount and direction of roll steer independently of the wheel path. The two arms of the composite suspension member are interconnected in such way as to provide a secondary axis of rotation preventing binding in the system, and also making it possible to so arrange a second suspension member as to provide any desired wheel path. A wheel path may thus be provided achieving desired anti-squat and anti-lift characteristics while at the same time providing the proper roll understeer.

In another modification of the invention, a single rigid arm is provided for each rear wheel and is pivotally supported upon the vehicle frame or body for swinging movement about a primary axis. The arm also has a pivotal connection with the wheel spindle about a generally longitudinally extending hinge axis which is inclined with respect to the primary axis as viewed in the side elevation of the vehicle. The primary and hinge axes may also be inclined with respect to each other when viewed in the plan view. The suspension arm is operatively connected to the vehicle spring and thus takes spring loads as well as braking and acceleration forces, in addition to providing fore and aft stability. A two-joint, non-extensible axle shaft cooperates with the suspension arm to complete the suspension system for each rear wheel and provides lateral stability as well as determining wheel tread, camber and roll-center height.

Another object of the present invention is to provide a rear wheel suspension achieving thrust sensitive understeer to provide some rear wheel understeer prior to the time actual roll takes place. The construction is such as to utilize the side thrust upon the road wheel resulting from cornering, crowned roads, wind thrust or the like, and to translate this side thrust immediately into understeer. Since there necessarily must be a time lag in wheel understeer resulting from car roll, this thrust sensitive steer is advantageous since it provides understeer prior to the time roll understeer takes effect. This may be accomplished by providing variable compliance between longitudinally spaced pivotal mountings of the suspension arm to the vehicle frame.

Still another object of the invention is to provide a rear wheel suspension having understeer characteristics and at the same time capable of achieving 100% anti-squat and 100% anti-lift. Ordinarily this cannot be accomplished since the compensating force vector available for brake lift is much smaller than the compensating force vector available for acceleration squat. In a conventional vehicle, all of the acceleration forces are applied at the rear wheels and can be utilized to counteract the rearward weight shift during acceleration. The braking forces, however, are distributed between the front and rear wheels, and only a portion, 40–45% for example, of the total braking effort is applied at the rear wheels. Consequently, a much smaller force is available to counteract the forward weight shift during braking. The present invention, however, provides a suspension having a rear axle differential carrier supported upon the vehicle frame, and an outboard brake mounted upon the wheel spindle support, in combination with a geometry providing roll understeer independently of the wheel path. With this combination it is possible to select the wheel path from an infinite variety of paths and to provide a combination achieving 100% anti-squat and anti-lift as well as roll understeer.

Other objects and advantages of this invention will be made more apparent as this description proceeds, particularly in connection with the accompanying drawings, in which:

FIGURES 10, 11, 12 and 13 are diagrammatic views showing graphically the rear wheel understeer. The views are shown in plan, side elevation, plan and rear elevation respectively;

Figure 1:
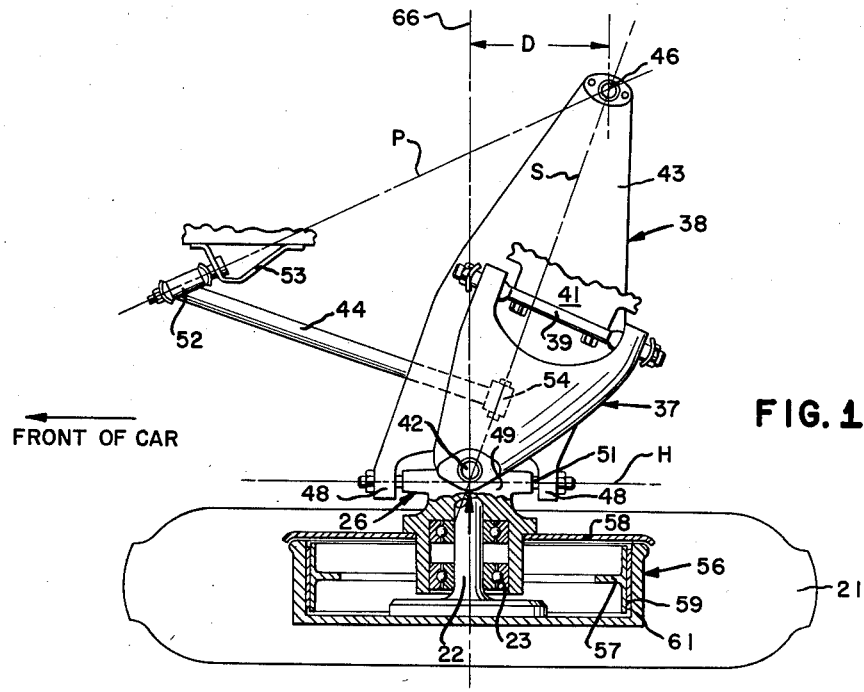
FIGURE 1 is a plan view, partly in section, of an embodiment of my invention.
Figure 2:
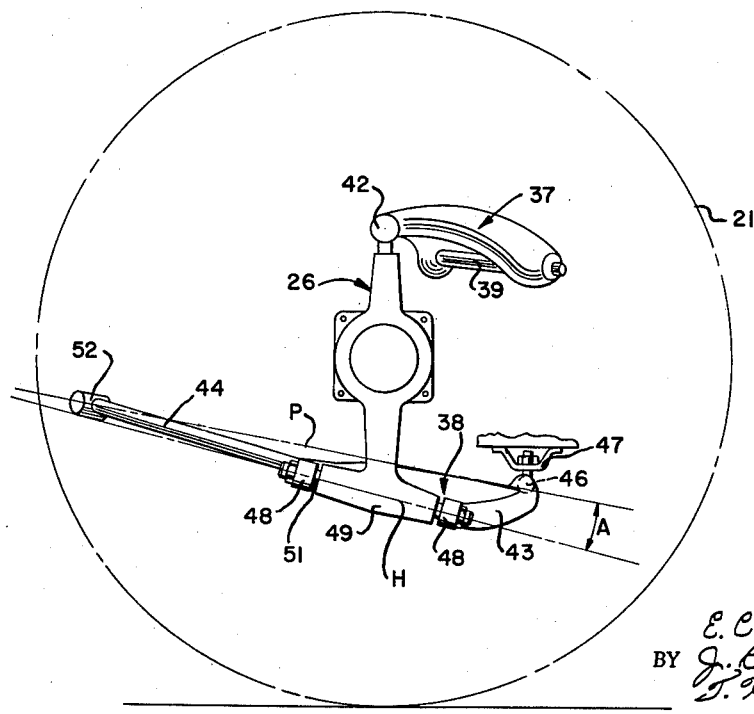
FIGURE 2 is a side elevational view of the construction shown in FIGURE 1.
Figure 3:
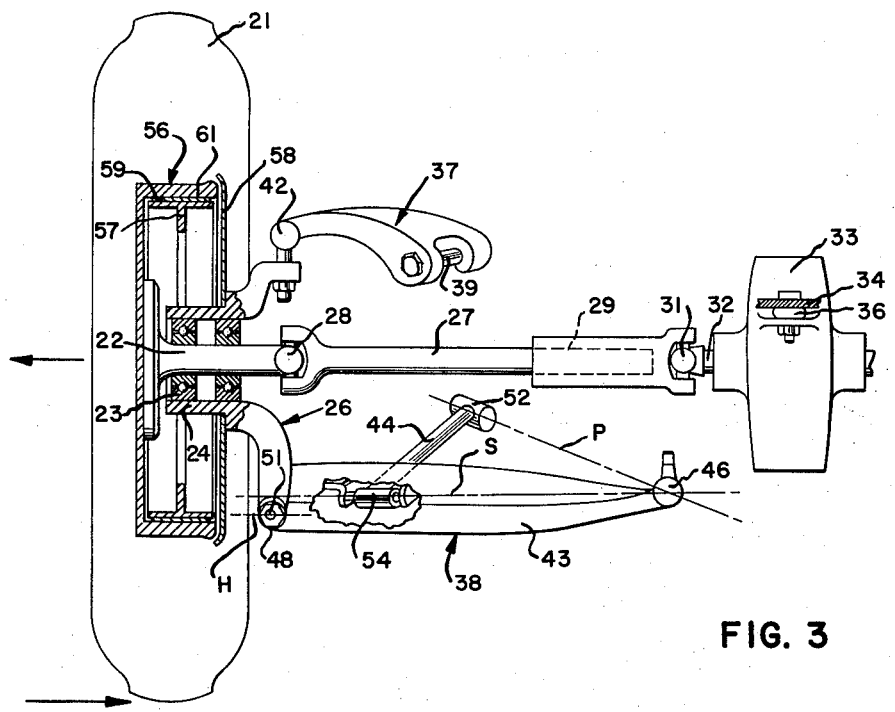
FIGURE 3 is a rear elevational view, partly in section, of the construction shown in FIGURES 1 and 2.

Referring now to the drawings, and particularly to the modification shown in FIGURES 1 to 3 inclusive, the reference character 21 indicates a rear road wheel for a vehicle. The wheel is provided with a spindle 22 rotatably mounted by means of bearings 23 in the hub 24 of a spindle support 26.

In each of the modifications I have shown only one road wheel, but it will be understood that the corresponding road wheel on the opposite side of the frame may be similarly suspended.

The rear wheel 21 is driven by means of an axle shaft 27 connected to the spindle 22 by a universal joint 28. The axle shaft 27 has a splined connection 29 and is connected by a universal joint 31 to a shaft 32 extending outwardly from the rear axle differential carrier 33. The differential carrier 33 is mounted upon a frame member 34 by means of a resilient mounting 36, and a similar mounting (not shown) is provided between the frame and the forward portion of the carrier. The carrier contains conventional differential gearing driven from the vehicle engine.

In this modification the road wheel is supported by means of an upper suspension arm 37 and a composite lower suspension struction 38. As best seen in FIGURE 1, the upper suspension arm 37 is a wishbone type arm pivotally mounted upon a shaft 39 suitably secured to a frame member 41. At its outer end the upper suspension arm 37 is connected by means of a ball joint 42 to the upper end of the wheel spindle support 26. A coil spring or other type spring (not shown) may be mounted between the lower suspension arm and the frame.

The lower suspension structure 38 is a composite type structure, and comprises a generally transversely extending lower suspension arm 43 and a control arm 44. The lower suspension arm 43 is connected at its inner end by means of a ball joint 46 to a frame bracket 47. At its outer end the lower suspension arm 43 has bifurcated flanges 48 embracing a hub portion 49 integrally formed at the lower end of the wheel spindle support 26. The flanges 48 are pivotally connected to the hub 49 by means of a pivot shaft 51. It will thus be seen that the lower suspension arm 43 of the composite lower suspension structure 38 is pivotally connected to the spindle support 26 for relative rotation about a generally longitudinally extending Hinge Axis H.

The control arm 44 of the composite lower suspension structure 38 is pivotally connected at its forward end 52 to a frame bracket 53 and at its rearward outer end 54 to an intermediate portion of the lower suspension arm 43. It will thus be seen that the composite lower suspension structure 38 comprising the arms 43 and 44 is pivotally supported upon the vehicle frame for swinging movement about a Primary Axis P.

Referring to the side elevational view of the structure shown in FIGURE 2, it will be noted that the Primary Axis P and the Hinge Axis H are angularly related with respect to each other, as viewed in side elevation, forming with each other an angle A. Expressed in another way, the Primary Axis P between the lower suspension structure and the frame and the Hinge Axis H between the lower suspension structure and the wheel spindle support, lie in planes normal to a vertical plane through the longitudinal center line of the vehicle, and the two planes containing these axes converge toward each other in a direction longitudinally of the vehicle. In the embodiment shown, the planes converge in a forward direction and form between them the angle A.

It will also be noted that the Primary Axis P and the Hinge Axis H are angularly related to each other as viewed in the plan view and that they converge in a direction forwardly of the vehicle.

As will be explained more in detail later in the specification in connection with diagrammatic views, this angular relationship between the Primary Axis P and the Hinge Axis H results in roll understeer during cornering when the inner and outer wheels move in rebound and jounce respectively. The amount of understeer depends upon the size of the angle A between the axes as viewed in side elevation, and the suspension may thus be designed to achieve any desired amount of understeer.

The ball connection 46 between the inner end of the lower suspension arm 43 and the frame, and the pivotal connection 54 between the lower suspension arm 43 and the control arm 44, lie on a Secondary Axis S which in the present embodiment extends generally transversely of the vehicle along the center line of the lower suspension arm 43. The suspension arm 43 may thus rock about the Secondary Axis S to provide the flexibility necessary to prevent binding in the system as the road wheel moves in jounce and rebound. In addition, this Secondary Axis provides independence of movement so that any one of an infinite variety of paths may be selected for the upper portion of the spindle support 26. In the modification shown in FIGURES 1 to 3 inclusive, the path of the upper portion of the spindle support is determined by the upper suspension arm 37, which is so mounted as to swing upwardly and rearwardly in jounce in such manner as to provide the necessary wheel path for the desired anti-squat and anti-lift characteristics.

From the foregoing it will be apparent that it is possible with the present construction to obtain the desired characteristics of anti-acceleration squat and anti-brake lift while at the same time providing the desired roll understeer.

As best seen in FIGURES 1 and 3, an outboard brake assembly 56 is provided and includes conventional brake shoes 57 mounted upon a brake backing plate 58 carried by the wheel spindle support 26. The brake linings 59 on the brake shoes 57 engage a conventional brake drum 61 carried by the road wheel 21. It will be apparent that the brake reaction force is taken through the spindle support and the upper and lower suspension structures.

Figure 9:
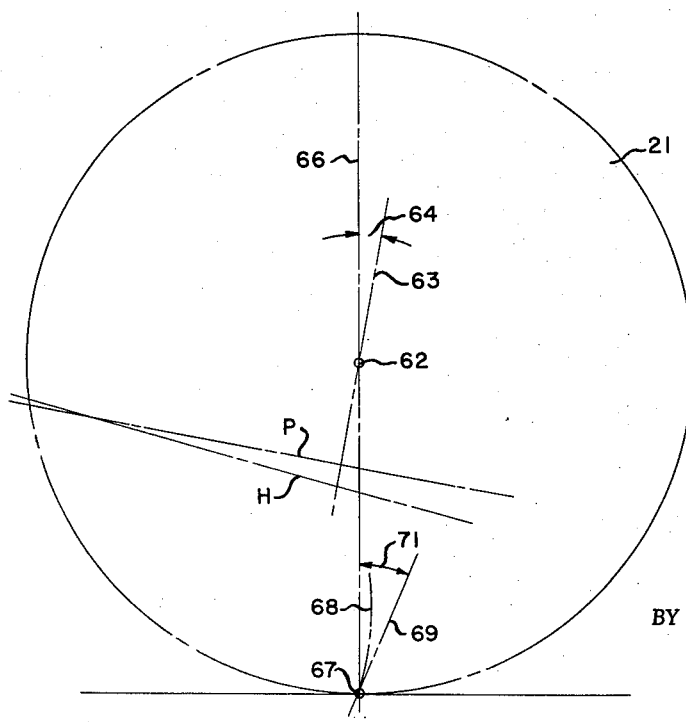
FIGURE 9 is a diagrammatic side view showing the paths of various wheel points during jounce and rebound.

Reference is now made to the diagram shown in FIGURE 9 which plots in side elevation the paths of various wheel points during jounce and rebound for the suspension structure shown in FIGURES 1 to 3 inclusive. Due to the suspension structure in combination with a frame mounted rear axle differential carrier and an outboard mounted brake assembly, the wheel center 62 moves along the path 63 during jounce and rebound. This path forms an angle 64 with a vertical transverse plane 66 through the wheel center, and provides a force vector in a vertical direction counteracting the tendency of the rearward portion of the vehicle to squat during acceleration. This force is calculated by multiplying the acceleration force applied at the wheel center by the tangent of the wheel path angle 64.

With outboard brakes of the type shown, the anti-lift characteristics during braking are determined by the path of the point of contact 67 between the road wheel 21 and the road. With the structure shown in FIGURES 1 to 3 inclusive, this contact point 67 follows a curved path 68, and a line 69 tangent to this path at the point of contact 67 is inclined rearwardly in an upward direction and forms an angle 71 with the vertical plane 66 through the wheel center. It will be noted that this angle is larger than the angle 64 formed by the wheel path 63 of the wheel center 62. Since the compensating force vector available to counteract brake lift is determined by the braking force multiplied by the tangent of the angle 71, it will be seen that a resultant anti-lift force can be obtained equivalent to the anti-squat force even though the braking force available is smaller, being divided between the front and rear wheels while the acceleration force is all applied at the rear wheels. The suspension structure of the present invention has sufficient flexibility in design to permit a geometrical arrangement such as that shown in which, if desired, 100% anti-squat as well as 100% anti-lift can be obtained in combination with the desired amount of roll understeer. If, however, an inboard mounted brake is provided adjacent the differential carrier, then a compromise must be made between anti-squat and anti-lift due to the brake distribution between the front and rear wheels and 100% anti-squat and 100% anti-lift cannot be simultaneously obtained.

Referring again to the modification shown in FIGURES 1 to 3 inclusive, and particularly to FIGURE 1, it will be noted that the pivotal connection 46 between the lower suspension arm 43 and the frame is located a distance D rearwardly of the vertical transverse plane 66 through the wheel center. The pivotal connection 54 between the control arm 44 and the lower suspension arm 43 comprises a rubber bushing providing not only pivotal movement about the Secondary Axis S but also resiliency in the direction of the control arm 44. This arrangement enables the suspension to achieve a degree of thrust-sensitive steer immediately upon the application of an activating force.

While the angular relation between the Primary Axis P and the Hinge Axis H results in understeer of the road wheel 21 during cornering, there is a certain time lag in this steering movement. This understeer can take place only after the centrifugal force upon the vehicle during cornering causes the outer wheel to move in jounce and the inner wheel in rebound. As soon as the centrifugal force is applied to the road wheel, however, this force is immediately available with the construction shown to provide a limited amount of understeer.

Referring to FIGURE 3, which shows the vehicle in rear elevation, and assuming a turn to the right, centrifugal force is effective immediately at the wheel center in an outboard or leftward direction. The reaction force at the point of contact between the road wheel and the road is effective in the opposite or inward direction, and applies an inward force to the lower suspension arm 43 through the wheel spindle 26 and the pivotal connection 51 between the spindle and arm. Referring now to FIGURE 1, it will be apparent that due to the rearward offset D of the ball joint mounting 46 of the lower suspension arm 43, the inward force applied to the outer end of the arm will result in a forward force component, and that this forward force component will compress the rubber bushing 54 forming the connection between the control arm 44 and the suspension arm 43, thus moving the road wheel forward slightly. The opposite conditions prevail at the right rear road wheel resulting in a rearward force component compressing the opposite side of the bushing at that side and moving the right rear wheel slightly rearwardly. The rear wheels are thus turned in the same direction as the front wheels to provide understeer, and it will be apparent that this understeer is effective immediately upon the application of the activating centrifugal force during cornering. It may also result from a side wind load or a crowned road. As the vehicle roll takes place, the understeer resulting from the angular relationship between the axes P and H will occur, and the final roll understeer will be a combination of the thrust-sensitive understeer and the roll understeer.

Figure 4:
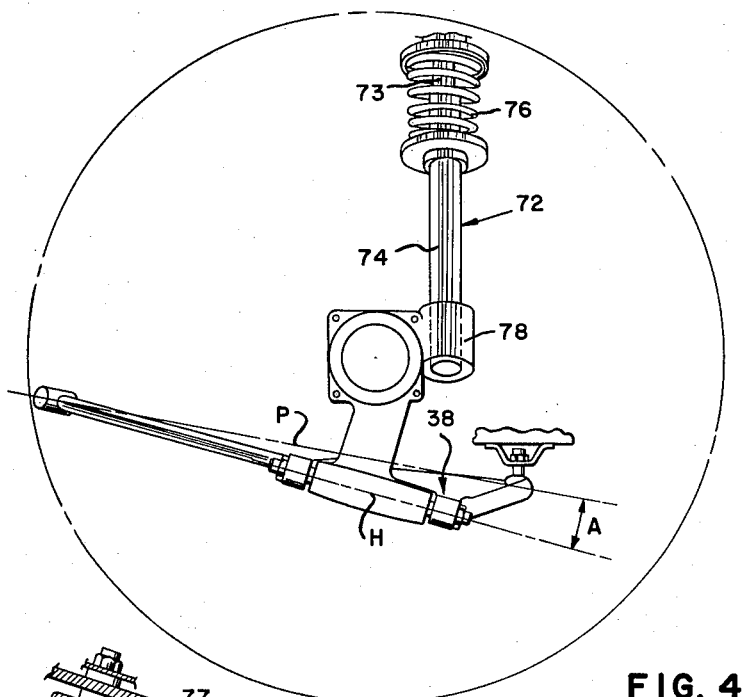
FIGURE 4 is a side elevational view of a modification.
Figure 5:
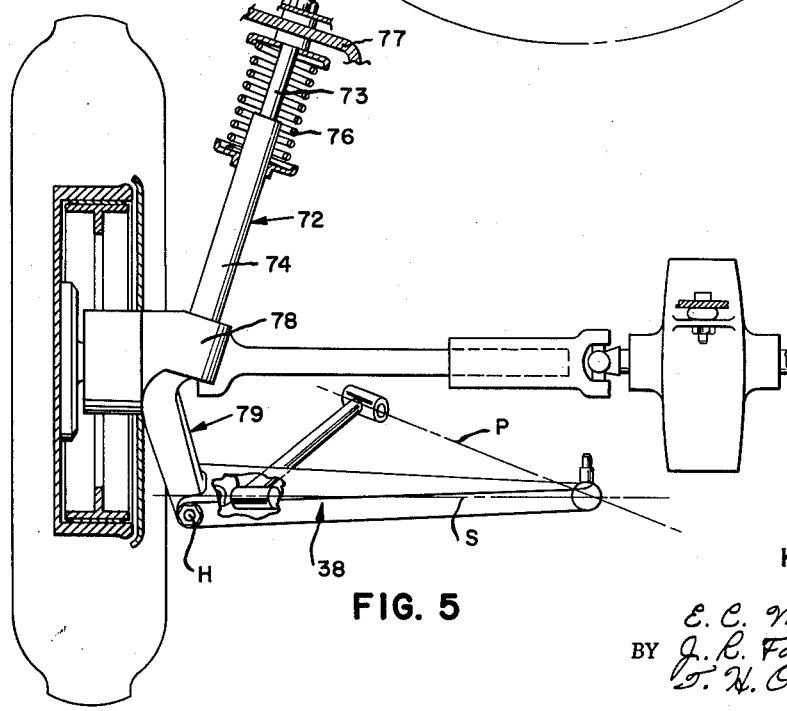
FIGURE 5 is a rear elevational view, partly in section, of the modification shown in FIGURE 4.

Referring now to the modification shown in FIGURES 4 and 5, it will be noted that the construction is similar to that shown in FIGURES 1 to 3 inclusive in that a similarly arranged composite lower suspension structure 38 is provided accomplishing roll understeer by means of inclined Primary and Hinge Axes P and H respectively. In lieu of the pivoted upper suspension arm 37, however, there is provided a pillar type upper suspension structure 72. This structure comprises upper and lower telescopically related struts 73 and 74 in combination with a suspension coil spring 76 mounted therebetween. The upper strut 73 is resiliently connected to a frame member 77 and the lower strut 74 is supported within an integral boss 78 projecting rearwardly and inwardly from the wheel spindle support 79.

By properly positioning the telescopic pillar assembly 72, the wheel path may be determined as desired. This modification illustrates the adaptability of the principle of the present invention to various types of suspensions capable of achieving the desired combination of roll understeer and anti-acceleration squat and anti-brake lift.

Figure 6:
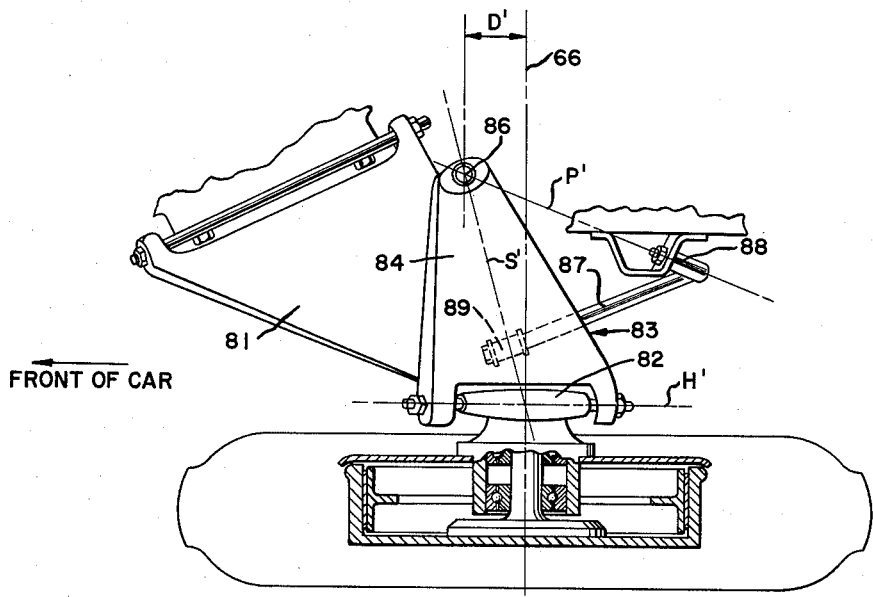
FIGURE 6 is a plan view, partly in section, of another modification.
Figure 7:
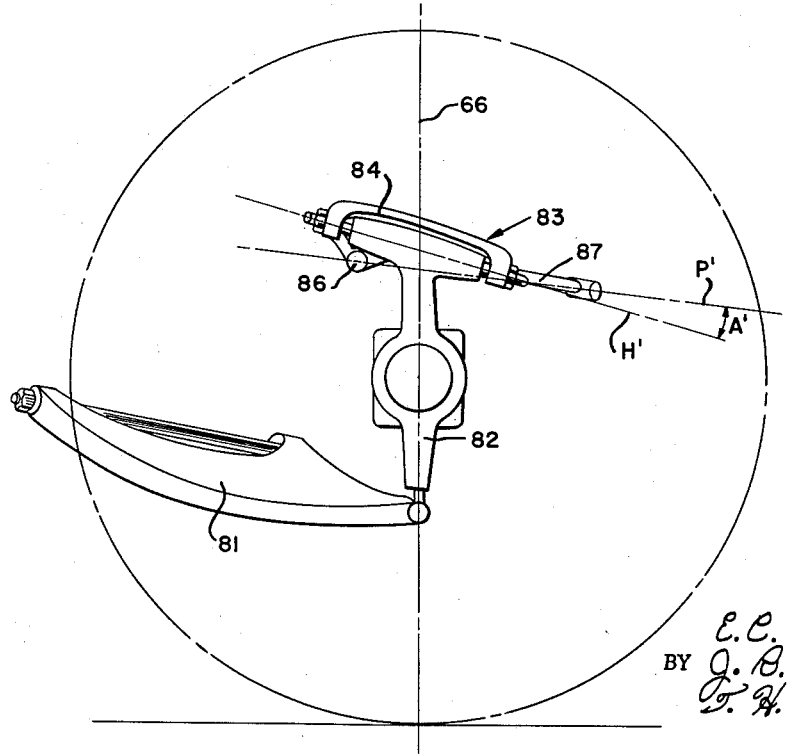
FIGURE 7 is a side elevational view of the modification shown in FIGURE 6.

The modification shown in FIGURES 6 and 7 illustrates a rear suspension generally reversed from the structure shown in FIGURES 1 to 3 in that a single lower suspension arm 81 is provided for guiding the lower portion of the wheel spindle support 82 while a composite upper suspension structure 83 guides the upper end of the spindle support.

The upper suspension structure 83 is formed of a transversely extending upper suspension arm 84 connected at its inner end to the vehicle frame by means of a ball joint 86 at a point located a distance D' forwardly of the transverse vertical plane 66 through the wheel center. A control arm 87 is pivotally connected to the vehicle frame at 88 and to the suspension arm 84 at 89 to form a Primary Axis P' between the upper suspension structure and the frame.

The upper suspension arm 84 is pivotally connected to the upper end of the wheel spindle support 82 for rotation about a Hinge Axis H', and it will be noted in FIGURE 7 that the axes P' and H' are angularly related with respect to each other in side elevation, forming therebetween an angle A'. As in the embodiment of the invention shown in FIGURES 1 to 3, the angularly related axes P' and H' result in roll understeer of the road wheel as a result of jounce and rebound movements of the outer and inner wheels, respectively, during cornering.

The pivotal connection 89 between the upper suspension arm 84 and the control arm 87 comprises a rubber bushing permitting a limited yielding in a longitudinal direction to achieve thrust-sensitive understeer immediately upon the application of side thrust to the road wheel. Since the composite suspension structure 83 is located above the wheel center line in this modification, the force acting upon it is reversed from that acting upon the lower composite suspension structure of FIGURES 1 to 3 inclusive. Since, however, the frame pivotal connection 86 of the suspension arm 84 is forward of the wheel axis, the force at the suspension arm resulting from wheel side thrust will result in a force component at the flexible connection 89 in the proper direction to provide a wheel understeer movement.

Figure 8:
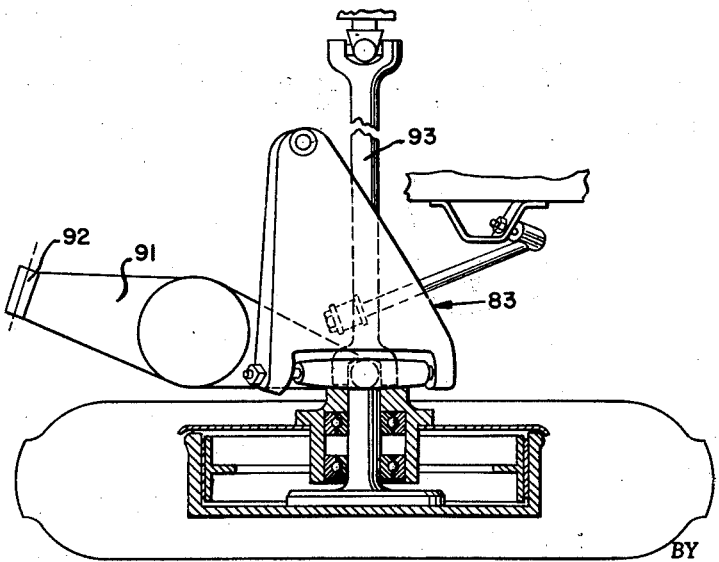
FIGURE 8 is a plan view, partly in section, of another modification.

FIGURE 8 illustrates another modification similar to that shown in FIGURES 6 and 7 in that the same composite upper suspension structure 83 is employed. Here, however, instead of utilizing a lower suspension arm of the wishbone type, as shown in FIGURE 6 at 81, which affords stability in all directions, there is employed a more economical lower suspension trailing arm 91 pivotally connected to the frame at 92. The arm 91 provides stability only in a longitudinal direction, but is arranged to function in combination with a solid axle shaft 93 which affords stability in a transverse direction. It will be noted that the usual splined connection is omitted and that the axle shaft 93 is rigid to afford this stability. If desired, the arrangement of FIGURE 8 can be reversed, utilizing the axle shaft and a longitudinally extending control arm as the upper suspension structure in combination with a composite lower arm of the type shown in FIGURES 1 and 2.

Reference is now made to diagrammatic views 10 to 13 inclusive which are presented to illustrate graphically the manner in which rear wheel understeer is obtained during jounce and rebound. The suspension selected for purposes of illustration is similar to that shown in FIGURES 1 to 3 inclusive in that it incorporates a single upper suspension arm 94 and a composite lower suspension structure having a lower suspension arm 96 and a control arm 97. For simplification, the inner axes of the upper and lower suspension structures have been made parallel to the ground and to the longitudinal center line of the car, but it will be understood that this arrangement is not necessary for a proper functioning of the invention.

In the diagrams, the Primary Axis P between the frame and the composite lower suspension structure 96–97 forms an angle A with the Hinge Axis H between the lower suspension arm 96 and the spindle support 98, as viewed in side elevation in FIGURE 11. Points X and Y have been selected on the Hinge Axis H and are plotted in FIGURES 12 and 13 both in jounce and in rebound to illustrate the understeer function of the suspension.

With reference now to the rear elevation shown in FIGURE 13, it will be seen that when the suspension moves in jounce through the angle C, the points X and Y on the Hinge Axis H swing about the Primary Axis P and assume positions X' and Y' respectively. It will be noted that point X' is moved inwardly a greater distance toward the car center line than point Y'. Projecting points X' and Y' to the plan view shown in FIGURE 12 it will be seen that they assume positions in plan along an axis H' inclined at an angle B with a line H parallel to the Hinge Axis H at design height. Thus, during jounce the wheel has a toe-in movement through the angle B, producing understeer.

With reference again to FIGURE 13, it will be seen that in rebound the points X and Y on the Hinge Axis H assume positions X" and Y" respectively. Again projecting these points to the plan view shown in FIGURE 12 it will be seen that points X" and Y" lie along an axis H" at an angle B to the Hinge Axis H, but inclined in the opposite direction from the axis H' in jounce. Thus the rear road wheel moving in rebound will toe out, and, in cooperation with the toe-in of the jounce wheel, produces understeer.

Figure 14:
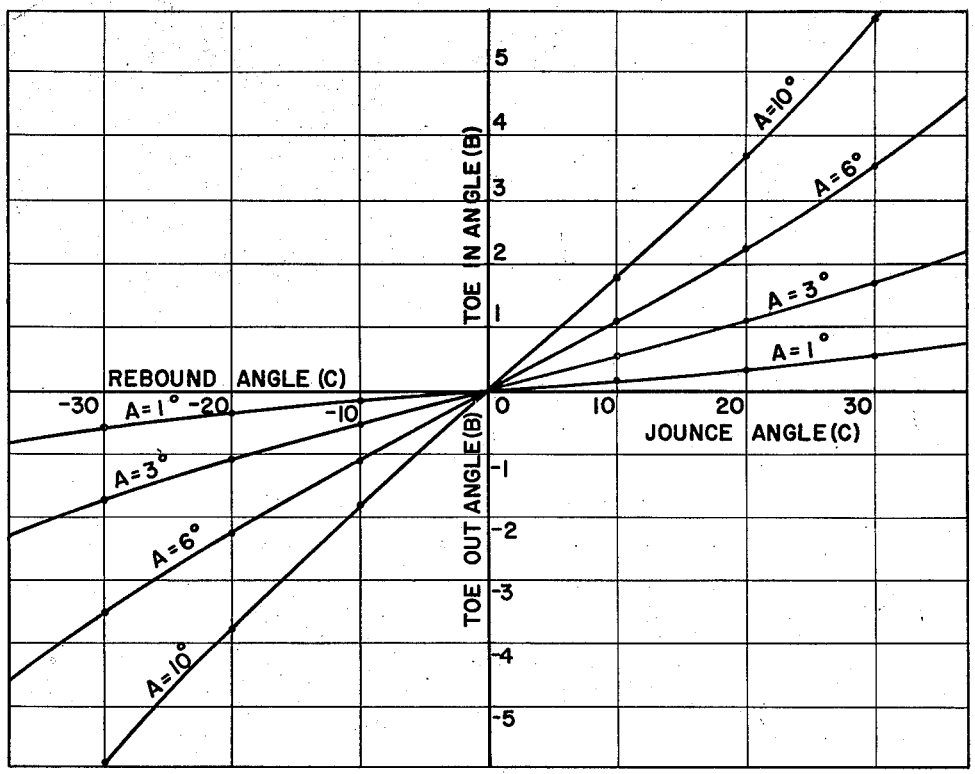
FIGURE 14 is a graph relating to FIGURES 10 to 13 inclusive.

FIGURE 14 illustrates graphically the amount of toe-in and toe-out of the rear wheel of FIGURES 10 to 13 inclusive in relation to the jounce and rebound angles through which the wheels move. For purposes of illustration, four curves are plotted using angles A of 1°, 3°, 6° and 10° between the Primary and Hinge Axes P and H.

The following equation expresses the relationship for the understeer angle of the construction diagrammatically shown in FIGURES 10 to 14 inclusive:

$$\operatorname{Tan} B = \frac{\sin A \sin C}{\sqrt{\cos^2 C - \sin^2 A}}$$

where:

$A$ = angle between Primary Axis P and Hinge Axis H $B$ = steer angle (under or over)

$C$ = jounce or rebound angle

*Figures 15–18*

FIGURES 15–18 inclusive illustrate a modification of the invention in which a rear wheel is supported and guided by means of a single suspension arm and a non-extensible axle shaft. The suspension arm is pivotally connected to the vehicle frame structure and to the wheel spindle support about primary and hinge axes respectively. These axes are angularly related with respect to each other, and are also related to a horizontal or ground plane and to the longitudinal center line of the vehicle, in such manner as to achieve the desired characteristics of anti-squat and anti-lift as well as roll understeer.

In this modification, the reference character 111 indicates a rear road wheel for a vehicle. The wheel is provided with a spindle 112 rotatably supported by means of bearings 113 in the hub 114 of a wheel spindle support 116.

The vehicle frame comprises side frame members 117 and a cross frame member 118 extending laterally between the side frame members, rearwardly of the axis of the rear road wheels. The cross frame member 118 is generally inverted U-shape in cross section and adjacent the longitudinal center line of the vehicle supports a rear axle differential carrier housing 121. The carrier housing 121 contains conventional differential gearing and is driven by the vehicle driveshaft 122. The side shafts of the differential are connected to Cardan type universal joints 123 positioned adjacent opposite sides of the housing 121 and these universal joints are connected by axle shafts 124 to similar universal joints 126 conventionally connecting the axle shafts to the wheel spindles 112. This arrangement is similar to the conventional axle arrangement provided with vehicles having suspended differential carriers except that the universal joint parts are rigidly connected to their respective shafts and do not have splined extensible connections. This results in a driving connection or assembly from the differential housing to the road wheels which is non-extensible and non-compressible in an axial or lateral direction and enables the axle shaft assembly to function as a component of the wheel suspension system.

A one-piece, generally L-shaped lower suspension arm 127 is positioned beneath the axle shaft 124. The longitudinally extending arm 128 of the suspension arm extends generally parallel to the side frame member 117 when viewed in plan and has an inwardly bent forward end portion 129 pivotally connected to a bracket 131 mounted upon the side frame member 117. The pivotal connection 132 comprises a conventional rubber bushing arranged on a Primary Axis P.

The other shorter leg 133 of the suspension arm extends generally laterally of the vehicle beneath the cross frame member 118 and has a pivotal connection 134 with a bracket 136 secured to the lower rearward portion of the differential carrier housing 121. The pivotal connection 134 also comprises a conventional rubber bushing and is located on the Primary Axis P with the front pivotal connection 132.

The longitudinal leg 128 of the lower suspension arm has an integral projecting portion 137 pivotally connected by means of a pivot pin 138 to the bifurcated downwardly depending flanges 139 of the spindle support 116. This connection provides a Hinge Axis H between the suspension arm and the spindle support.

The transversely extending leg 133 of the suspension arm 127 is provided with an enlarged spring supporting pocket 141 forming a support for the lower end of the coil spring 142. The upper end of the coil spring is received within a similar pocket 143 formed in the cross frame member 118.

It will be seen from the foregoing that the suspension arm 127 and the axle shaft 124 cooperate to guide the road wheel 111 during its rising and falling movements relative to the vehicle frame. The suspension arm 127 not only takes the spring load but also the braking and acceleration forces. In addition, it provides longitudinal stability for the road wheel. The axle shaft 124, with its interconnected universal joints, provides lateral stability for the wheel since it is of invariant or constant length and does not incorporate a splined or slip joint as in the conventional construction. Thus it cooperates with the suspension arm to provide complete control for the road wheel during jounce and rebound.

Figure 15:
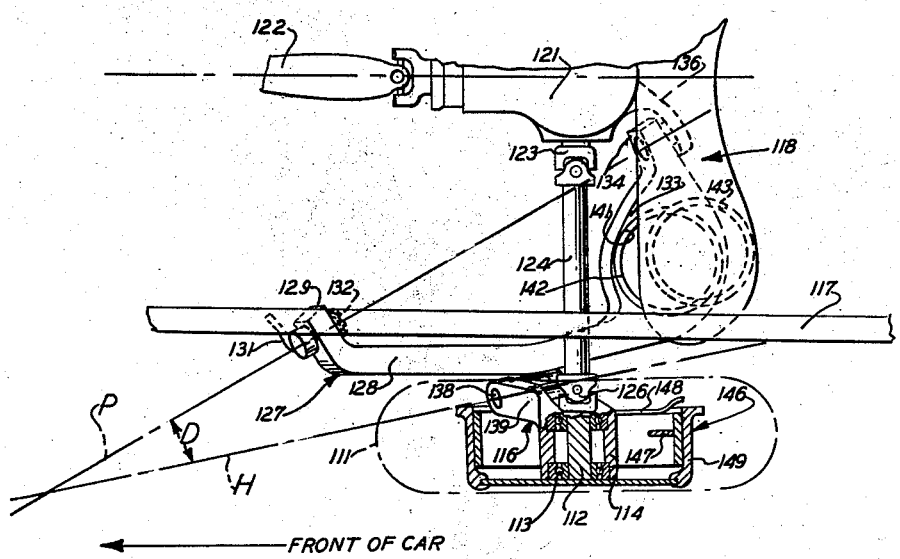
FIGURE 15 is a plan view, partly in section, of another modification.
Figure 17:
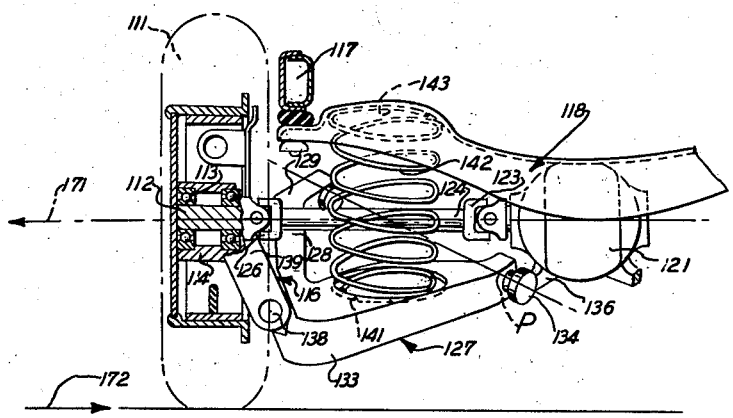
FIGURE 17 is a rear elevational view of the construction shown in FIGURE 15.

As best seen in FIGURES 15 and 17, an outboard brake assembly 146 is provided and includes conventional brake shoes 147 mounted upon a brake backing plate 148 carried by the wheel spindle support 116. The brake linings on the brake shoes 147 engage a conventional brake drum 149 carried by the road wheel 111, and it will be apparent that the brake reaction force for each rear wheel is taken through the spindle support and the suspension arm 127.

To provide anti-squat characteristics the wheel center 151 (FIGURE 16) should move upwardly and rearwardly in jounce. A line 153 tangent to the path 152 at the wheel center 151 forms an angle S with a vertical transverse plane 154 through the wheel center and provides a force vector in a vertical direction counteracting the tendency of the rearward portion of the vehicle to squat during vehicle acceleration. This force may be calculated by multiplying the acceleration force applied at the wheel center 151 by the tangent of the wheel path angle S.

A primary factor in achieving this wheel center path resides in the inclination of the Primary Axis P in an upward and forward direction with respect to the ground as viewed in the side elevation of the vehicle. With a proper orientation of the Primary Axis P it is possible to obtain any desired amount of anti-squat. In some instances 100% anti-squat is advantageous, while in others an intermediate value is sufficient.

In a suspension of the type shown, and with outboard brakes, the anti-lift characteristics during braking are determined by the path of the point of contact 161 between the road wheel 111 and the ground. This contact point 161 follows a curved path 162 and a line 163 tangent to this path at the point of contact 161 is inclined rearwardly in an upward direction and forms an angle L with the vertical plane 154 through the wheel center 151. The compensating force available to counteract brake lift is determined by the braking force multiplied by the tangent of the angle L. The angle L is larger than the angle S, and consequently a resultant anti-lift force can be obtained with this suspension system equal to the anti-squat force, even though the braking force available is smaller (the braking force being divided between the front and rear wheels while the acceleration force is all applied to the rear wheels). The geometry of the suspension may be designed to achieve any amount of anti-lift, 100% if desired, or an intermediate value.

Figure 16:
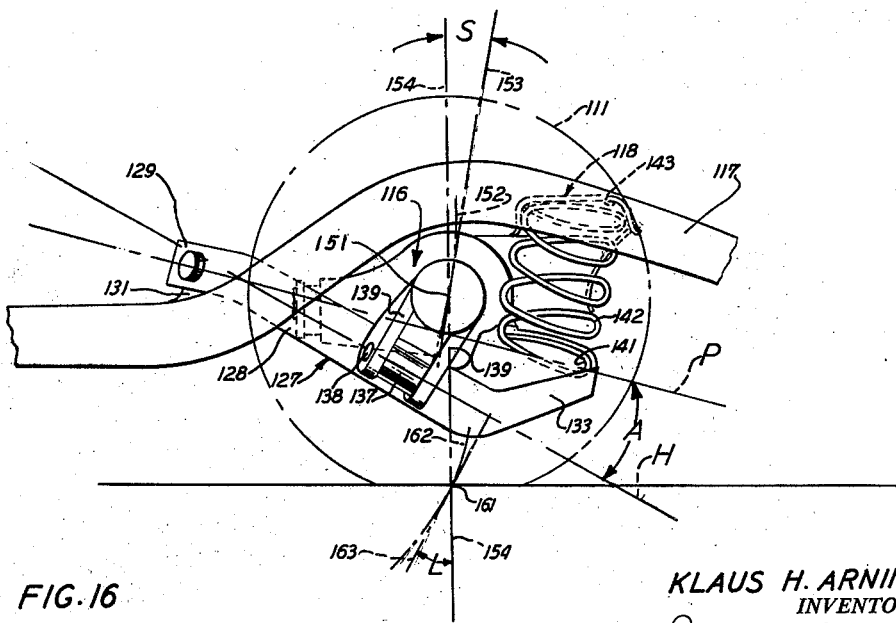
FIGURE 16 is a side elevational view of the construction shown in FIGURE 15.

In the embodiment of the invention shown in FIGURES 15 to 17 inclusive, as well as in the other embodiments, it is possible to achieve anti-squat and anti-lift characteristics while at the same time providing roll understeer. In conventional suspensions roll understeer is inconsistent and incompatible with anti-squat and anti-lift. The present invention, however, makes it possible to achieve all of these desirable characteristics at the same time by proper orientation of the Primary Axis P and the Hinge Axis H. The particular orientation of the axes depends in a certain measure upon the design characteristics of the vehicle to which the suspension is being applied and also upon the desired amount of anti-squat, anti-lift and roll understeer.

If desired, the suspension can be designed to achieve 100% anti-squat and 100% anti-lift in combination with the appropriate roll understeer to provide the proper handling characteristics for the vehicle. In other instances, however, less than 100% anti-squat and anti-lift may be desired.

The principal design factor in achieving roll understeer in any given design is the differential angle A between the Primary Axis P and the Hinge Axis H as viewed in the side elevation of the vehicle. Although considerable variation in the size of this angle many exist, dependent upon the various other factors of the suspension, it has been found that the angle A should be greater than 5 degrees in order to achieve any significant results. A small angle of this type, for example, might be found in a suspension in which a very small percentage of anti-squat is incorporated yet in which roll understeer is desired. In other instances the differential angle A, as viewed in the side elevation, might be as high as 45 degrees, although in most installations an intermediate value will be satisfactory.

It thus appears that a practical range for the differential angle A between the Primary Axis P and the Hinge Axis H, as viewed in the side elevation of the vehicle, may be within the range of 5 degrees to 45 degrees. The Primary Axis P and the Hinge Axis H converge in a forward direction when the suspension arm is located beneath the axle shaft.

It has also been found that the inclination of the Hinge Axis H to the horizontal or to the ground, as viewed in the side elevation, will be greater than 5 degrees in suspension systems of this type.

The orientation of the Primary Axis P and the Hinge Axis H as viewed in the plan view of the vehicle is perhaps less critical and considerable variations may exist. It has been found, however, that the differential angle D between the axes will be greater than 5 degrees (in plan view) in suspension in which significant results are obtained. These axes will converge in a forward direction both when the suspension arm is located beneath the axle shaft and also when it is located above the axle shaft.

The following chart illustrates the orientation and angular relationship of the axes P and H in actual vehicles incorporating rear suspensions constructed according to the present invention.

|  | Vehicle A | Vehicle B |
| --- | --- | --- |
| Angle A between axes P and H (side elevation) | 25° | 22° |
| Angle D between axes P and H (plan view) | 14° | 21° |
| Angle between axis H and ground line (side elevation) | 40° | 30° |

The design of the suspension system of the present invention is quite flexible and the orientation and angular relationship of the pertinent axes may be varied within practical limits to achieve the desired anti-squat, anti-lift and roll understeer characteristics for a particular vehicle.

It is also possible with the modification of FIGURES 15 to 17 to provide proper compliance in the pivotal joints of the suspension arm to provide a limited amount of rear wheel understeer prior to the time actual vehicle roll takes place. Normally understeer can only be provided after the centrifugal force upon the vehicle during cornering causes the outer wheel to move in jounce and the inner wheel in rebound. This can be anticipated, however, by a construction in which the rubber in the pivotal connection 132 between the forward end of the suspension arm 127 and the frame is softer and/or thicker than the rubber in the corresponding pivotal connection 134 between the rearward end of the suspension arm and the frame.

As shown in FIGURE 17, and assuming the vehicle to be turned to the right, centrifugal force is effective at the wheel center in an outward direction as indicated by the arrow 171. The reaction force at the point of contact of the wheel and the ground is effective in the opposite direction and applies an inward force to the suspension arm 127 in the direction of the arrow 172. This force will be transmitted to the front and rear rubber bushings 132 and 134, but since the forward bushing 132 is more yieldable the suspension arm 127 will have a slight forward movement resulting in a forward movement and toe-in of the wheel. An opposite or rearward movement will occur in the opposite road wheel and it will be seen that the wheels are thus turned in the same direction as the front wheels to provide understeer immediately effective upon the application of centrifugal force during cornering or from a side wind load or a crowned road.

The modification shown in FIGURES 15 to 17 inclusive will also automatically provide a degree of understeer as long as either or both of the pivotal connections 132 and 134 incorporate rubber or other compliant material. In this case a lateral force on the wheel moves the suspension arm 127 laterally, carrying with it the Hinge Axis H. Inasmuch as the axle shaft 124 is both non-extensible and non-contractable it acts as a strut with the outer universal joint 126 and the wheel spindle 112 moving an arcuate path about the pivot formed by the inner universal joint 123. This results in relative angular movement between the suspension arm 127 and the spindle 112 about the Hinge Axis H, and since the Hinge Axis H is inclined to the horizontal and understeer movement of the wheel 111 is achieved.

Figure 18:
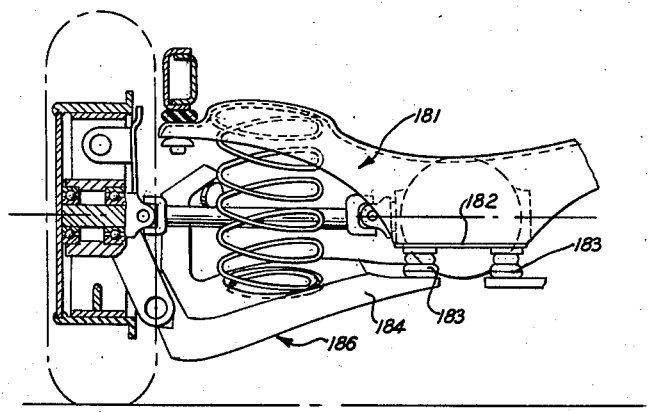
FIGURE 18 is a rear elevational view of a modification of the construction shown in FIGURE 17.

Referring now to the modification shown in FIGURE 18, it will be noted that the cross frame member 181, which is of inverted U-shape, is provided with a lower plate portion 182 supporting the socket portions of a pair of ball joint assemblies 183. The ball studs of the ball joint assemblies 183 are mounted upon the rear arm portions 184 of the suspension arms 186. Thus the suspension arms are pivotally mounted upon the vehicle frame rather than upon the differential carrier as in FIGURES 15 to 17. It will be apparent that the two types of mountings are equivalent, and also that ball joints may be used in lieu of bushings for the pivotal mountings of the suspension arms.

FIGURES 19–20

Figure 19:
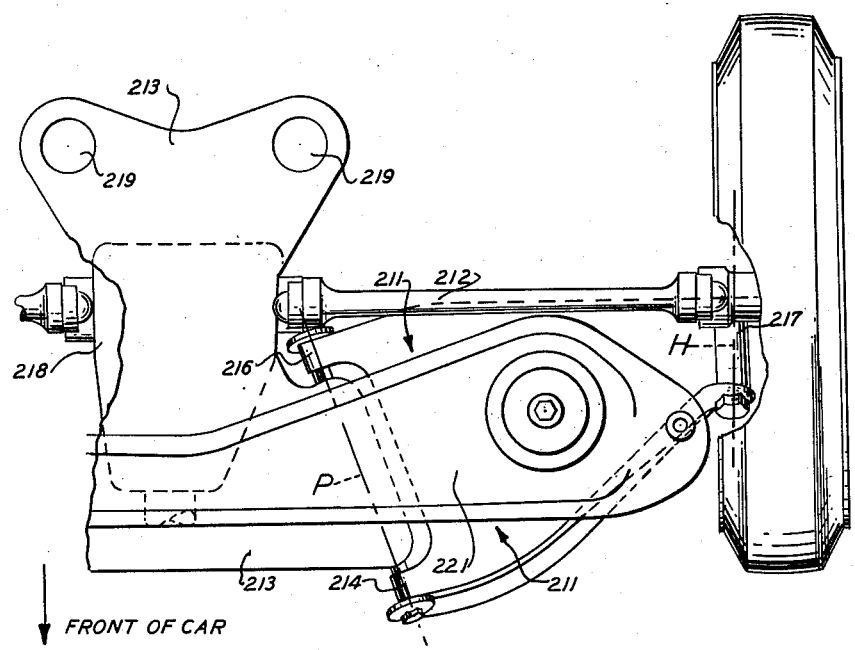
FIGURE 19 is a plan view, partly in section, of another modification.
Figure 20:
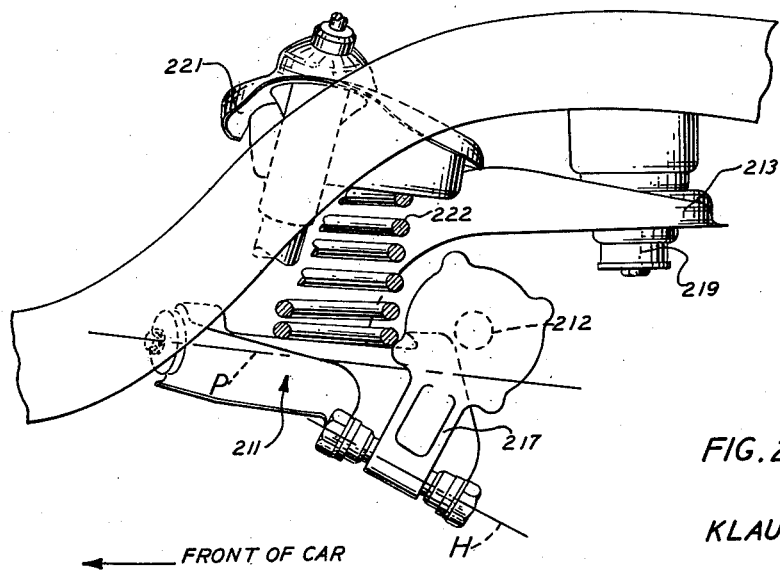
FIGURE 20 is a side elevational view of the construction shown in FIGURE 19.

FIGURES 19 and 20 illustrate another modification of the invention. This modification is generally similar to the form of the invention shown in FIGURES 15 to 18, differing therefrom primarily in that the suspension arm 211 is located forwardly of the axle shaft 212 rather than straddling the shaft. The suspension arm 211 is pivotally supported upon a frame support member 213 by a pair of pivotal connections 214 and 216 both of which are located forwardly of the axle shaft 212. The pivotal connections 214 and 216 form a Primary Axis P and the pivotal connection between the outer end of the suspension arm 211 and the wheel spindle support 217 forms a Hinge Axis H.

The frame support member 213 also supports the differential carrier 218, and in turn is mounted upon the vehicle frame by resilient mounts 219. The forward portion of the frame support member 213 supports a cross member 221, the latter also serving as a support for a coil spring 222 carried by the suspension arm.

The geometry of this modification is generally the same as the form of the invention shown in FIGURES 15–18 with the Primary Axis P and the Hinge Axis H being angularly related to each other both as viewed in side elevation and in the plan view.

Figures 21–22

Figure 21:
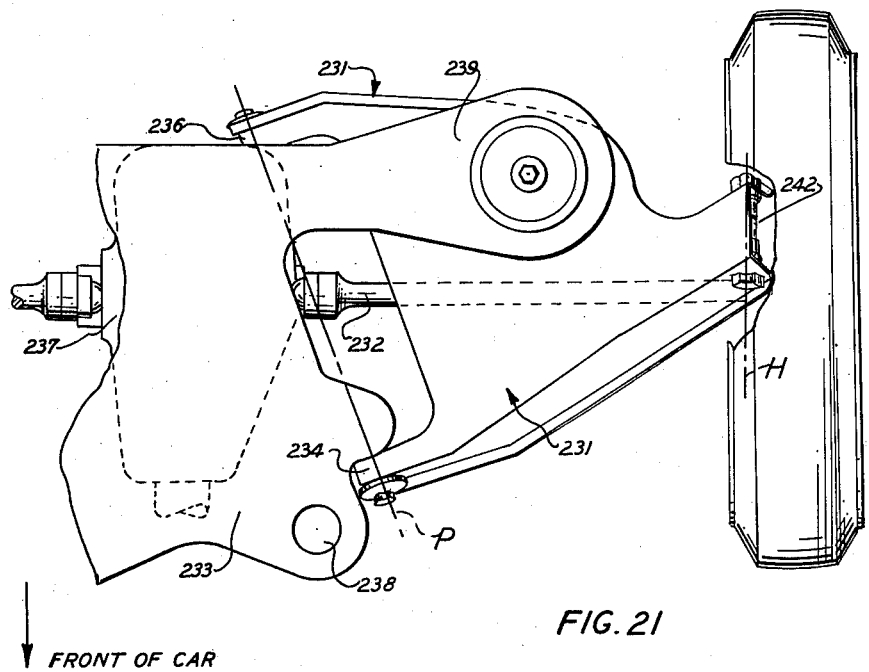
FIGURE 21 is a plan view, partly in section, of another modification.
Figure 22:
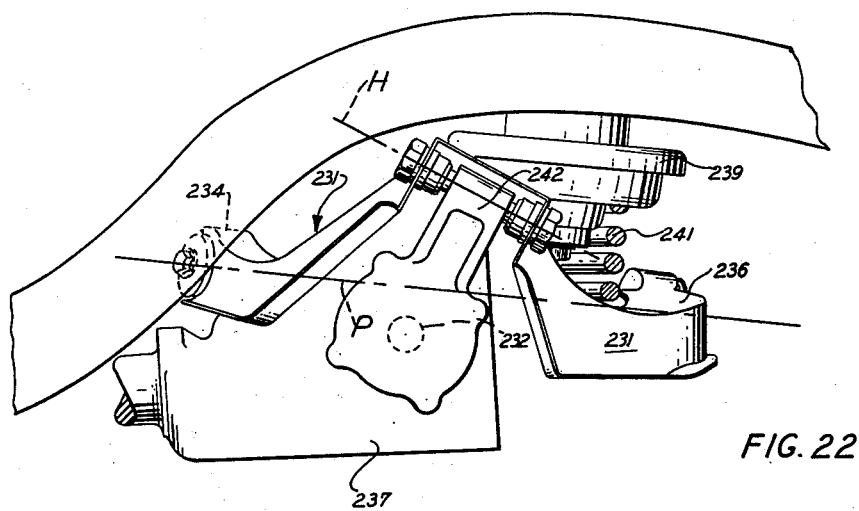
FIGURE 22 is a side elevational view of the construction shown in FIGURE 21.

FIGURES 21 and 22 show another modification in which the wheel supporting means are reversed with the suspension arm 231 being located vertically above the axle shaft 232. The suspension arm 231 is pivotally supported upon a frame support member 233 by a pair of pivotal connections 234 and 236, forming a Primary Axis P. The frame support member 233 also supports the differential carrier 237, and in turn is mounted upon the vehicle frame by resilient mounts 238. Lateral extensions 239 of the frame support member serve to support a coil spring 241 carried by the suspension arm. The outer end of the suspension arm 231 is pivotally connected to the wheel spindle support 242 about a Hinge Axis H.

The Primary Axis P and the Hinge Axis H are angularly related to each other as viewed in the plan view, and converge forwardly of the vehicle as in the FIGURE 15 and FIGURE 19 modifications. In the side elevation the Primary Axis P and the Hinge Axis H are also angularly related to each other, but it will be noted that they converge rearwardly instead of forwardly due to the reversal of the suspension arm and the axle shaft. This arrangement achieves the same operating characteristics as the other modifications.

The forms of the invention shown in FIGURES 15 to 22 inclusive utilize an axle shaft of constant or invariant length to enable the axle shaft to form part of the suspension system for the wheel and provide lateral stability therefor. The suspension arm provides additional wheel supporting and guiding functions. Similar results can be obtained by utilizing a suspension arm of the type shown with a conventional extensible axle shaft by providing an additional suspension structure of invariant length between the frame and the wheel support to perform the suspension functions of an axle shaft of invariant length.

The relationship for the understeer angle of the construction shown in FIGURES 15 to 18 inclusive, and also FIGURES 19 and 20, can be expressed in the following formulas, where:

$X$ = angle between Primary Axis P and ground (as viewed in the side elevation)
$Y$ = angle between Hinge Axis H and ground (as viewed in the side elevation)
$Z$ = angle between Primary Axis P and center line of vehicle (as viewed in the plan view)
$E$ = angle of rotation of suspension arm about Primary Axis P in jounce and rebound
$F$ = angle of rotation of wheel spindle support relative to suspension arm about Hinge Axis H in jounce and rebound
Steer Angle $(E)$ = wheel steer angle resulting from $E$
Steer Angle $(F)$ = wheel steer angle resulting from $F$
Net Steer Angle = net wheel steer angle resulting from $E$ and $F$ The following formula represents the steer angle of the wheel resulting only from the rotation of the suspension arm about the Primary Axis P in jounce and rebound. In this formula it is assumed that there is no relative rotation between the wheel spindle support and the suspension arm about the Hinge Axis H. This results in wheel toe-out in jounce and toe-in in rebound, causing oversteer.

Tan Steer Angle $(E) =$ $$\frac{\cos Z \sin X}{\cos E + \sin^2 Z\,(1 - \cos E)}\left[\sin E - \frac{\sin E}{\tan X}(1 - \cos E)\right]$$

The steer angle of the wheel resulting only from the rotation of the wheel spindle support relative to the suspension arm about the Hinge Axis H is expressed in the next formula. This results in toe-in in jounce and toe-out in rebound, causing understeer.

Tan Steer Angle $(F) = \sin Y \tan F$

Steer Angle (F) for this suspension is larger than Steer Angle (E). The Net Steer Angle is the difference between the two and results in understeer.

Net Steer Angle = Steer Angle (F) − Steer Angle (E)

The term "frame" when used in the specification and claims, will be understood to refer to either a conventional vehicle frame or a conventional unitary frame and body construction, and is intended to include vehicle structure and components connected to or supported upon the frame structure and forming part of the sprung portion of the vehicle.

It will be understood that the invention is not to be limited to the exact constructions shown and described, but that various changes and modifications may be made without departing from the spirit and scope of the invention, as defined in the appended claims.

I claim:

1. In a motor vehicle, in combination, a frame, a wheel support, a rear road wheel rotatably mounted upon said wheel support, upper and lower suspension structures guiding said road wheel during jounce and rebound movements, one of said suspension structures being connected between said frame and one portion of said wheel support to form a guiding support for the latter, and the other of said suspension structures being universally connected at one end to said frame and pivotally connected at its opposite end to another portion of said wheel support, and a control arm pivotally connected at its opposite ends to said frame and to an intermediate portion of said other suspension structure, said last named pivotal connection between said other suspension structure and said control arm permitting rotation therebetween about a generally transversely extending axis.

2. In a motor vehicle, in combination, a frame, a wheel support, a rear road wheel rotatably mounted upon said wheel support, upper and lower suspension structures guiding said road wheel during jounce and rebound movements, one of said suspension structures being connected between said frame and one portion of said wheel support to form a guiding support for the latter, the other of said suspension structures having two relatively movable suspension arms, one of said arms extending generally transversely and being universally connected at its inner end to said frame, the outer end of said one arm being pivotally connected to said wheel support about a generally longitudinally extending hinge axis, the other of said suspension arms being pivotally connected to said frame at one end and to said one suspension arm at its other end with the pivotal connections of said two suspension arms to said frame lying on a primary axis which is angularly related to said hinge axis in the side elevational view of said vehicle to steer said rear road wheel slightly as it moves in jounce and rebound.

3. The structure defined by claim 2 which is further characterized in that the pivotal connections of said transversely extending suspension arm to said frame and to said other suspension arm lie on a secondary axis permitting rocking movement of said transversely extending suspension arm about said secondary axis as said road wheel moves in jounce and rebound.

4. The structure defined by claim 3 which is further characterized in that said secondary axis substantially intersects the hinge axis between said wheel support and said transversely extending suspension arm.

5. The structure defined by claim 2 which is further characterized in that said angularly related primary and hinge axes lie in planes normal to the longitudinal vertical center plane of said vehicle and which planes converge in a direction forwardly of said vehicle to turn said wheel support and said road wheel in a toe-in direction in wheel jounce and in a toe-out direction in wheel rebound.

6. In a motor vehicle, in combination, a frame, a generally vertically extending wheel support, a rear road wheel rotatably mounted upon said wheel support, a generally transversely extending lower suspension arm having a pivotal connection at its inner end to said frame, means pivotally connecting the outer end of said suspension arm to a lower portion of said wheel support for relative pivotal movement about a generally longitudinally extending axis, a control arm pivotally connected to said suspension arm and to said frame, said first mentioned axis being inclined in side elevation with respect to an axis joining the pivotal connections of said suspension arm and said control arm to said frame, and movable means connecting an upper portion of said wheel support to said frame.

7. The structure defined by claim 6 which is further characterized in that the pivotal connection of said lower suspension arm to said frame is located rearwardly of the transverse vertical plane through the axis of said road wheel, and yieldable means incorporated in one of the connections of said control arm to yield longitudinally under side thrust upon said road wheel to produce understeer of said rear road wheel.

8. The structure defined by claim 6 which is further characterized in that said movable means comprises a generally transversely extending upper suspension arm pivotally connected at its inner and outer ends to said frame and to said upper portion of said wheel support respectively to guide the latter in a predetermined path during jounce and rebound.

9. In a motor vehicle, in combination, a frame, a generally vertically extending wheel support, a rear road wheel rotatably mounted upon said wheel support, a generally transversely extending upper suspension arm having a pivotal connection at its inner end to said frame at a point spaced forwardly of the transverse vertical plane through the axis of said road wheel, means pivotally connecting the outer end of said upper suspension arm to an upper portion of said wheel support for relative pivotal movement about a generally longitudinally extending axis, a control arm having its opposite ends pivotally connected to said upper suspension arm and to said frame, one of said last named pivotal connections being yieldable in a direction longitudinally of the vehicle, said first mentioned axis between said upper suspension arm and said wheel support being inclined in side elevation with respect to an axis through the pivotal connections of said upper suspension arm and said control arm to said frame, and a lower suspension arm having pivotal connections to said frame and to a lower portion of said wheel support.

10. In a motor vehicle, in combination, a frame, rear road wheels at opposite sides of said frame, a rear axle housing supported upon said frame adjacent the longitudinal center line of said vehicle, transversely extending axle shafts drivingly connecting said rear axle housing to said wheels, wheel supports rotatably supporting said wheels, brakes for said wheels mounted upon said wheel supports, upper and lower suspension members for each of said wheel supports arranged to guide the rear road wheel carried thereby in a predetermined path during jounce and rebound wheel movements to counteract acceleration squat and brake lift, one of said suspension members comprising two articulated sections, and a pivotal connection between one of the articulated sections of said one suspension member and said wheel support forming an axis inclined in side elevation with respect to the pivotal axis between the pivotal connections of said two articulated sections of said one suspension member and the vehicle frame to provide roll understeer for said rear road wheels.

11. In a motor vehicle, in combination, a frame, rear road wheels at opposite sides of said frame, a rear axle housing supported upon said frame adjacent the longitudinal center line of said vehicle, transversely extending axle shafts drivingly connecting said rear axle housing to said wheels, wheel supports rotatably supporting said wheels, brakes for said wheels mounted upon said wheel supports, upper and lower suspension members for each of said wheel supports arranged to guide the rear road wheel carried thereby in a predetermined path during jounce and rebound wheel movements to counteract acceleration squat and brake lift, one of said suspension members comprising two articulated sections each pivotally connected to said frame for pivotal movement of said one suspension member about a fixed axis, and a pivotal connection between one of the articulated sections of said one suspension member and said wheel support along an axis inclined in side elevation with respect to said fixed axis to steer said rear road wheel in a toe-in direction during wheel jounce and in a toe-out direction during wheel rebound to provide roll understeer for said rear wheels while at the same time providing anti-squat and anti-lift forces during acceleration and braking respectively of said vehicle.

12. In a motor vehicle, in combination, a frame, rear road wheels at opposite sides of said frame, a rear axle housing supported upon said frame adjacent the longitudinal center line of said vehicle, transversely extending axle shafts drivingly connecting said rear axle housing to said wheels, wheel supports rotatably supporting said wheels, brakes for said wheels mounted upon said wheel supports, upper and lower suspension members for each of said wheel supports arranged to guide the rear road wheel carried thereby in a predetermined path having a rearward movement in wheel jounce to counteract acceleration squat and a forward movement in wheel rebound to counteract brake lift, one of said suspension members having two pivotally interconnected sections each pivotally connected to said frame for pivotal movement of the interconnected sections about a fixed axis, and means pivotally connecting one of said sections to said wheel support about an axis forming an angle with said fixed axis when viewed in the side elevation of said vehicle to provide roll understeer for said rear road wheels.

13. The structure defined by claim 12 which is further characterized in that said one suspension section extends generally transversely of said vehicle and rocks during wheel jounce and rebound movements about a transversely extending axis through the pivotal connection of said one section to said frame and the pivotal interconnection between said sections.

14. In a rear wheel suspension for a motor vehicle having a frame, a wheel support for said wheel, a suspension member mounted upon said frame for swinging movement about a fixed axis, and a pivotal connection between said suspension member and said wheel support for pivotal movement therebetween about a generally longitudinally extending axis, said two axis lying in planes at right angles to the longitudinal vertical center plane of the vehicle and which planes converge in a direction longitudinally of the vehicle, said suspension member comprising a pair of sections flexibly connected together for relative movement therebetween about a generally transversely extending axis, and a second suspension member extending between said frame and said wheel support to assist in guiding the movement of said wheel.

15. In a rear wheel suspension for a motor vehicle having a frame, a wheel support for said wheel, a suspension member universally connected to said frame and pivotally connected to said wheel support about a generally longitudinal axis, and a second suspension member connected to said frame and pivotally connected to said first suspension member for relative pivotal movement therebetween about a generally transverse axis and a third suspension member extending between said frame and said wheel support to assist in guiding the movement of said wheel.

16. In a motor vehicle, in combination, a frame, a wheel support, a rear road wheel rotatably mounted upon said wheel support, upper and lower suspension structures guiding said road wheel during jounce and rebound movements, one of said suspension structures being connected between said frame and one portion of said wheel support to form a guiding support for the latter, and the other of said suspension structures being universally connected at one end to said frame and pivotally connected at its opposite end to another portion of said wheel support, and a control arm pivotally connected at its opposite ends to said frame and to an intermediate portion of said other suspension structure, the primary axis joining the pivotal connections of said control arm and said other suspension structure to said frame being angularly related to the hinge axis between said other suspension structure and said wheel support, said angularly related primary and hinge axes being convergent in a direction forwardly of said vehicle when viewed in the side elevation of said vehicle to turn said wheel support and said road wheel in a toe-in direction in wheel jounce and in a toe-out direction in wheel rebound.

17. In a motor vehicle, in combination, a frame, a wheel support, a rear road wheel rotatably mounted upon said wheel support, upper and lower suspension structures guiding said road wheel during jounce and rebound movements, one of said suspension structures being connected between said frame and one portion of said wheel support to form a guiding support for the latter, the other of said suspension structures having two relatively movable suspension arms, one of said arms being pivotally connected at one end to said frame and pivotally connected at its other end to said wheel support about a generally longitudinally extending hinge axis, the other of said suspension arms being pivotally connected at one end to said frame and at its other end to said one suspension arm with the pivotal connections of said two suspension arms to said frame lying on a primary axis which is angularly related to said hinge axis in the side elevational view of said vehicle to steer said rear road wheel slightly as it moves in jounce and rebound.

18. The structure defined by claim 17 which is further characterized in that the pivotal connection of said one suspension arm to said frame is offset longitudinally with respect to the vertical transverse plane through the axis of said road wheel, and yieldable means incorporated in one of the connections of said other suspension arm to yield longitudinally under side thrust upon said road wheel to produce understeer of said road wheel.

19. In a motor vehicle, in combination, a frame, a generally vertically extending wheel support, a rear road wheel rotatably mounted upon said wheel support, a lower suspension arm having a pivotal connection at one end to said frame, means pivotally connecting the other end of said suspension arm to a lower portion of said wheel support for relative pivotal movement about a generally longitudinally extending axis, a control arm pivotally connected to said suspension arm and to said frame, said first mentioned axis being inclined in side elevation with respect to an axis joining the pivotal connections of said suspension arm and said control arm to said frame, and movable means connecting an upper portion of said wheel support to said frame.

20. In a motor vehicle, in combination, a frame, a generally vertically extending wheel support, a rear road wheel rotatably mounted upon said wheel support, an upper suspension arm having a pivotal connection at one end to said frame, means pivotally connecting the other end of said suspension arm to an upper portion of said wheel support for relative pivotal movement about a generally longitudinally extending axis, a control arm pivotally connected to said suspension arm and to said frame, said first mentioned axis being inclined in side elevation with respect to an axis joining the pivotal connections of said suspension arm and said control arm to said frame, and movable means connecting a lower portion of said wheel support to said frame.

21. In a motor vehicle, in combination, a frame, rear road wheels at opposite sides of said frame, a rear axle housing supported upon said frame adjacent the longitudinal center line of said vehicle, transversely extending axle shafts drivingly connecting said rear axle housing to said wheels, wheel supports rotatably supporting said wheels, brakes for said wheels, upper and lower suspension members for each of said wheel supports arranged to guide the rear road wheel carried thereby in a predetermined path during jounce and rebound wheel movements to counteract acceleration squat and brake lift, one of said suspension members comprising two articulated sections, and a pivotal connection between one of the articulated sections of said one suspension member and said wheel support forming an axis inclined in side elevation with respect to the pivotal axis between the pivotal conections of said two articulated sections of said one suspension member and the vehicle frame to provide roll understeer for said rear road wheels.

22. In a motor vehicle, in combination, a frame, rear road wheels at opposite sides of said frame, a rear axle housing supported upon said frame adjacent the longitudinal center line of said vehicle, transversely extending axle shafts drivingly connecting said rear axle housing to said wheels, wheel supports rotatably supporting said wheels, brakes for said wheels, upper and lower suspension members for each of said wheel supports arranged to guide the rear road wheel carried thereby in a predetermined path having a rearward movement in wheel jounce to counteract acceleration squat and a forward movement in wheel rebound to counteract brake lift, one of said suspension members having two pivotally interconnected sections each pivotally connected to said frame for pivotal movement of the interconnected sections about a fixed axis, and means pivotally connecting one of said sections to said wheel support about an axis forming an angle with said fixed axis when viewed in the side elevation of said vehicle to provide roll understeer for said rear road wheels.

23. In a motor vehicle, in combination, a frame, rear road wheels at opposite sides of said frame, a rear axle housing supported upon said frame adjacent the longitudinal center line of said vehicle, non-extensible transversely extending axle shafts drivingly connecting said rear axle housing to said wheels, wheel supports rotatably supporting said wheels, a suspension structure for each of said wheel supports arranged to guide the rear road wheel carried thereby in a predetermined path during jounce and rebound wheel movements to counteract acceleration squat and brake lift, said suspension structure comprising two articulated sections, and a pivotal connection between one of the articulated sections and said wheel support forming an axis inclined in side elevation with respect to the pivotal axis between the pivotal connections of said two articulated sections with the vehicle frame to provide roll understeer for said rear road wheels.

24. In a motor vehicle, in combination, longitudinally extending side frame members, rear road wheels on the outboard sides of said side frame members, wheel supports rotatably supporting said road wheels, a cross frame member extending laterally between said side frame members rearwardly of the axis of said wheels, a rear axle housing supported upon said cross frame member, axle shafts drivingly connecting said axle housing to said road wheels, a suspension arm for each road wheel extending beneath the adjacent axle shaft and having longitudinally spaced portions pivotally connected on a common axis to the vehicle frame forwardly and rearwardly respectively of said axle shaft, and means pivotally connecting said suspension arm to said wheel support about an axis angularly arranged to said common axis when viewed in the side elevation of said vehicle and also when viewed in the plan view of said vehicle, said axes converging in a forward direction in both side elevation and plan.

25. The structure defined by claim 24 which is further characterized in that said suspension arm has a spring supporting portion rearwardly of said axle shaft beneath said cross frame member, and a suspension spring between said spring supporting portion and said cross frame member.

26. The structure defined by claim 25 which is further characterized in that said suspension arm is generally L-shaped in plan view with one leg extending longitudinally adjacent one of said side frame members and pivotally connected thereto at its forward end and the other leg extending laterally beneath said cross frame member and pivotally connected thereto at its rearward end and including said spring supporting portion.

27. In a motor vehicle, in combination, a frame structure including an axle housing supported thereon, road wheels at opposite sides of said frame, transversely extending, non-extensible axle shafts connecting said axle housing to said wheels to form driving connections therebetween and to form part of the suspension systems for said wheels and provide lateral stability therefor, wheel supports rotatably supporting said wheels, a suspension arm for each of said wheels, each of said suspension arms extending beneath the adjacent axle shaft and being generally U-shaped in plan view with its forward leg portion pivotally connected to said frame structure forwardly of said axle shafts and its rear leg portion pivotally connected to said frame structure rearwardly of said axle shafts, said pivotal connections of the two leg portions of each of said suspension arms lying on a common axis extending diagonally with respect to the longitudinal center line of the vehicle, and means pivotally connecting the outer end of said suspension arm to said wheel support about a hinge axis forming an angle with the axis of said arm when viewed in the side elevation of said vehicle to steer the adjacent wheel as it moves in jounce and rebound.

28. The structure defined by claim 27 which is further characterized in that each of said suspension arms has a spring supporting portion rearwardly of said axle shafts, and a coil spring positioned between the spring supporting portion of said suspension arm and said frame.

29. In a motor vehicle, in combination, longitudinally extending side frame members, rear road wheels on the outboard sides of said side frame members, wheel supports rotatably supporting said road wheels, a cross frame member extending laterally between said side frame members rearwardly of the axis of said wheels, a rear axle housing supported upon said cross frame member, axle shafts extending laterally from said axle housing to said wheels, universal joints between said axle housing and said axle shafts and between said axle shafts and said wheels to form driving connections therebetween, said axle shafts and universal joints being non-extensible in an axial direction to form part of the suspension systems for said wheels and provide lateral stability therefor as well as assisting in guiding the jounce and rebound movements of said wheels relative to said frame, and a suspension arm extending beneath each of said axle shafts and having longitudinally spaced portions pivotally connected to said cross frame member and to one of said side frame members on a common pivotal axis, the connection of said suspension arm to said side frame member being forwardly of said axle shafts, each of said suspension arms also having a pivotal connection to the adjacent wheel support beneath the axle shaft, the axle of said last named pivotal connection forming an angle to said common pivotal axis when viewed in the side elevation of the vehicle to provide roll understeer for said vehicle.

30. In a motor vehicle, in combination, longitudinally extending side frame members, road wheels on the outboard sides of said side frame members, wheel supports rotatably supporting said road wheels, a cross frame member extending laterally between said side frame members, a rear axle housing supported upon said cross frame member forwardly therefrom, axle shafts extending laterally from said axle housing to said wheels, universal joints between said axle housing and said axle shafts and between said axle shafts and said wheels to form driving connections therebetween, said axle shafts and universal joints being non-extensible in an axial direction to form part of the suspension systems for said wheels and provide lateral stability therefor as well as assisting in guiding the jounce and rebound movements of said wheels relative to said frame, and a suspension arm for each of said wheels, each of said suspension arms beneath said axle shaft having longitudinally spaced portions pivotally connected to said cross frame member and to one of said side frame members respectively on a common pivotal axis, said two pivotal axes for the suspension arms converging rearwardly of said vehicle, each of said suspension arms also having a pivotal connection to the adjacent wheel support, the axis of said last named pivotal connection forming an angle with said common pivotal axis when viewed in the side elevation of the vehicle.

31. In a motor vehicle, in combination, a frame, a road wheel, power transmitting means supported upon said frame, a transversely extending axle shaft of invariant length connecting said power transmitting means to said wheel to form a driving connection therebetween and to form part of the suspension system for said wheel and provide lateral stability therefor, a wheel support rotatably supporting said wheel, a suspension arm for said wheel, said supension arm being pivotally connected to said frame for pivotal movement of said arm about a pivot axis, and means pivotally connecting said suspension arm to said wheel support for pivotal movement about a hinge axis forming an angle greater than 5 degrees with said pivot axis when viewed in the side elevation of said vehicle.

32. In a motor vehicle, in combination, a frame, a road wheel, power transmitting means supported upon said frame, a transversely extending axle shaft of invariant length connecting said power transmitting means to said wheel to form a driving connection therebetween and to form part of the suspension system for said wheel and provide lateral stability therefor, a wheel support rotatably supporting said wheel, a suspension arm for said wheel, said suspension arm being pivotally connected to said frame for pivotal movement of said arm about a pivot axis, and means pivotally connecting said suspension arm to said wheel support for pivotal movement about a hinge axis forming an angle with said pivot axis when viewed in the side elevation of said vehicle, said angle being within the range 5 degrees to 45 degrees.

33. In a motor vehicle, in combination, a frame, a road wheel, a wheel support rotatably supporting said road wheel, power transmitting means supported upon said frame, a pair of vertically spaced suspension structures forming the entire guiding and supporting means for said wheel, one of said pair of suspension structures comprising a transversely extending axle shaft of invariant length connecting said power transmitting means to said wheel support to form a driving connection therebetween, the other of said suspension structures comprising a suspension arm for said wheel, said suspension arm being pivotally connected to said frame for pivotal movement of said arm about a fixed pivot axis, and means nonadjustably pivotally connecting said suspension arm to said wheel support for pivotal movement about a fixed hinge axis forming an angle with the pivot axis of said arm when viewed in the side elevation of said vehicle and also when viewed in the plan view.

34. In a motor vehicle, in combination, a frame, a road wheel, power transmitting means supported upon said frame, a transversely extending axle shaft of invariant length connecting said power transmitting means to said wheel to form a driving connection therebetween and to form part of the suspension system for said wheel and provide lateral stability therefor, a wheel support rotatably supportng said wheel, a suspension arm for said wheel, said suspension arm being pivotally connected to said frame for pivotal movement of said arm about a pivot axis, and means pivotally connecting said suspension arm to said wheel support for pivotal movement about a hinge axis forming an angle with the pivot axis of said arm when viewed in the side elevation of said vehicle and also when viewed in the plan view, the angle between said pivot and hinge axes as viewed in the side elevation of said vehicle being greater than 5 degrees.

35. The structure defined by claim 34 which is further characterized in that the angle between said pivot and hinge axes as viewed in the side elevation of said vehicle is within the range of 5 degrees to 45 degrees.

36. In a motor vehicle, in combination, a frame, a road wheel, power transmitting means supported upon said frame, a transversely extending axle shaft of invariant length connecting said power transmitting means to said wheel to form a driving connection therebetween and to form part of the suspension system for said wheel and provide lateral stability therefor, a wheel support rotatably supporting said wheel, a suspension arm for said wheel, said suspension arm being pivotally connected to said frame for pivotal movement of said arm about a pivot axis, and means pivotally connecting said suspension arm to said wheel support for pivotal movement about a hinge axis forming an angle with the pivot axis of said arm when viewed in the side elevation of said vehicle and also when viewed in the plan view, the angle between said pivot and hinge axes as viewed in the plan view of said vehicle being greater than 5 degrees.

37. In a motor vehicle, in combination, a frame, a road wheel, a wheel support rotatably supporting said road wheel, power transmitting means supported upon said frame, a pair of vertically spaced suspension structures forming the entire guiding and supporting means for said wheel, one of said pair of suspension structures comprising a transversely extending axle shaft of invariant length connecting said power transmitting means to said wheel support to form a driving connection therebetween, the other of said suspension structures comprising a suspension arm for said wheel pivotally connected to said frame for pivotal movement of said arm about a fixed first axis, and nonadjustable means pivotally connecting said suspension arm to said wheel support for pivotal movement about a fixed second axis angularly related to said first axis when viewed in the side elevation of said vehicle and also when viewed in the plan view of said vehicle, said fixed axes converging in a forward direction in both side elevation and plan.

38. In a motor vehicle, in combination, a frame, a road wheel, a wheel support rotatably supporting said road wheel, power transmitting means supported upon said frame, a pair of vertically spaced suspension structures forming the entire guiding and supporting means for said wheel, one of said pair of suspension structures comprising a transversely extending axle shaft of invariant length connecting said power transmitting means to said wheel support to form a driving connection therebetween, the other of said suspension structures comprising a suspension arm for said wheel having longitudinally spaced portions pivotally connected on a fixed first axis to said frame forwardly and rearwardly respectively of said axle shaft, and nonadjustable means pivotally connecting said suspension arm to said wheel support for pivotal movement about a fixed second axis angularly related to said first axis when viewed in the side elevation of said vehicle and also when viewed in the plan view of said vehicle, said fixed axes converging in a forward direction in both side elevation and plan.

39. In a motor vehicle, in combination, a frame, a road wheel, power transmitting means supported upon said frame, a transversely extending axle shaft of invariant length connecting said power transmitting means to said wheel to form a driving connection therebetween and to form part of the suspension system for said wheel and provide lateral stability therefor, a wheel support rotatably supporting said wheel, a suspension arm for said wheel, said suspension arm being pivotally connected to said frame for pivotal movement of said arm about a pivot axis, and means pivotally connecting said suspension arm to said wheel support for pivotal movement about a hinge axis forming an angle greater than 5 degrees with the horizontal when viewed in the side elevation of said vehicle.

40. In a motor vehicle, in combination, a frame, a road wheel, a wheel support rotatably supporting said road wheel, power transmitting means supported upon said frame, a pair of vertically spaced suspension structures forming the entire guiding and supporting means for said wheel, one of said pair of suspension structures comprising a transversely extending axle shaft of invariant length having its inner end connected to said power transmitting means and its outer end connected to said wheel support by means of universal connections, the other of said suspension structures comprising a suspension arm of said wheel pivotally connected to said frame for pivotal movement of said arm about a pivot axis, and means pivotally connecting said suspension arm to said wheel support for pivotal movement about a hinge axis, said pivot and hinge axes being inclined with respect to the horizontal when viewed in the side elevation of said vehicle, the angle between said hinge axis and the horizontal being greater than the angle between said pivot axis and the horizontal.

41. In a motor vehicle, in combination, a frame, a road wheel, a wheel support rotatably supporting said road wheel, power transmitting means supported upon said frame, a pair of vertically spaced suspension structures forming the entire guiding and supporting means for said wheel, one of said pair of suspension structures comprising a transversely extending axle shaft of invariant length connecting said power transmitting means to said wheel support to form a driving connection therebetween, the other of said suspension structures comprising a suspension arm for said wheel pivotally connected to said frame for pivotal movement of said arm about a fixed pivot axis, and means pivotally connecting said suspension arm to said wheel support for pivotal movement about a fixed hinge axis forming an angle with the horizontal when viewed in the same elevation of said vehicle, said fixed pivot and hinge axes being angularly related with respect to each other when viewed in the side elevation of said vehicle.

42. In a motor vehicle, in combination, a road wheel, power transmitting means supported upon said frame, a transversely extending axle shaft of invariant length connecting said power transmitting means to said wheel to form a driving connection therebetween and to form part of the suspension system for said wheel and provide lateral stability therefor, a wheel support rotatably supporting said wheel, a suspension arm for said wheel, said suspension arm being pivotally connected to said frame for pivotal movement of said arm about a pivot axis, and means pivotally connecting said suspension arm to said wheel support for pivotal movement about a hinge axis, forming an angle with the horizontal when viewed in the side elevation of said vehicle, said pivot and hinge axes being angularly related with respect to each other when viewed in the side elevation of said vehicle, the angle between said pivot and hinge axes when viewed in the side elevation of said vehicle being greater than 5 degrees.

43. The structure defined by claim 42 which is further characterized in that the angle between said pivot and hinge axes as viewed in the side elevation of said vehicle is within the range of 5 degrees to 45 degrees.

44. In a motor vehicle, in combination, a frame, a road wheel, a wheel support rotatably supporting said road wheel, power transmitting means supported upon said frame, a pair of vertically spaced suspension structures forming the entire guiding and supporting means for said wheel, one of said pair of suspension structures comprising a transversely extending axle shaft of invariant length having its inner end connected to said power transmitting means and its outer end connected to said wheel support by means of universal connections, the other of said suspension structures comprising a suspension arm for said wheel pivotally connected to said frame for pivotal movement of said arm about a pivot axis, said pivot axis being inclined with respect to the horizontal, and means pivotally connecting said suspension arm to said wheel support for pivotal movement about a hinge axis forming an angle with said pivot axis when viewed in the side elevation of said vehicle.

45. The structure defined by claim 44 which is further characterized in that said pivot axis is inclined upwardly in a forward direction with respect to the horizontal.

46. In a motor vehicle, in combination, a frame, a road wheel, a wheel support rotatably supporting said road wheel, power transmitting means supported upon said frame, a pair of vertically spaced suspension structures forming the entire guiding and supporting means for said wheel, one of said pair of suspension structures comprising a transversely extending axle shaft of invariant length having its inner end connected to said power transmitting means and its outer end connected to said wheel support by means of universal connections, the other of said suspension structures comprising a suspension arm for said wheel pivotally connected to said wheel support for pivotal movement about an axis forming an angle with the longitudinal centerline of said vehicle, and said suspension arm being pivotally connected to said frame for pivotal movement about an axis forming an angle with said first-mentioned axis.

47. In a motor vehicle, in combination, a frame, a road wheel, a wheel support rotatably supporting said road wheel, power transmitting means supported upon said frame, a pair of vertically spaced suspension structures forming the entire guiding and supporting means for said wheel, one of said pair of suspension structures comprising a transversely extending axle shaft of invariant length having its inner end connected to said power transmitting means and its outer end connected to said wheel support by means of universal connections, the other of said suspension structures comprising a suspension arm for said wheel pivotally connected to said frame for pivotal movement of said arm about a pivot axis, said pivot axis being inclined with respect to the longitudinal centerline of the vehicle as viewed in the plan view, and means pivotally connecting said suspension arm to said wheel support for pivotal movement about a hinge axis forming an angle with said pivot axis when viewed in the side elevation of said vehicle.

48. The structure defined by claim 47 which is further characterized in that said pivot axis is inclined laterally outwardly in a forward direction with respect to the longitudinal centerline of the vehicle.

49. In a motor vehicle, in combination, a frame, a road wheel, power transmitting means supported upon said frame, a transversely extending axle shaft of invariant length connecting said power transmitting means to said wheel to form a driving connection therebetween and to form part of the suspension system for said wheel and provide lateral stability therefor, a wheel support rotatably supporting said wheel, a suspension arm for said wheel positioned above said axle shaft, said suspension arm being pivotally connected to said frame for pivotal movement of said arm about an axis extending generally longitudinally of said vehicle, and means pivotally connecting said suspension arm to said wheel support about an axis forming an angle of greater than 5 degrees with respect to said first-mentioned axis when viewed in the side elevation of said vehicle.

50. In a motor vehicle, in combination, a frame, a road wheel, a wheel support rotatably supporting said road wheel, power transmitting means supported upon said frame, an axle shaft drivingly connecting said power transmitting means to said road wheel, a suspension arm for said road wheel having laterally spaced portions pivotally connected to said frame and to said wheel support respectively, the axes of the pivotal connections of said suspension arm to said frame and to said wheel support forming an angle with respect to each other when viewed in the side elevation of said vehicle of greater than 5 degrees and less than 45 degrees, said suspension arm and its said pivotal connections to said frame and to said wheel support being located vertically above said axle shaft.

51. The structure defined by claim 50 which is further characterized in that a suspension spring is mounted between said suspension arm and said frame and above said suspension arm.

52. In a motor vehicle, in combination, a frame, a road wheel, a wheel support rotatably supporting said road wheel, power transmitting means supported upon said frame, an axle shaft drivingly connecting said power transmitting means to said road wheel, a suspension arm for said road wheel pivotally connected to said frame for pivotal movement of said arm about a first axis, and means pivotally connecting said suspension arm to said wheel support for pivotal movement about a second axis forming an angle greater than 5 degrees with the horizontal when viewed in the side elevation of said vehicle, said first and second axes forming an angle with respect to each other when viewed in the side elevation of said vehicle greater than 5 degrees and less than 45 degrees.

53. In a motor vehicle, in combination, a frame, a road wheel at one side of said frame, a wheel support rotatably supporting said wheel, and a pair of vertically spaced suspension structures extending between said frame and said wheel support, one of said suspension structures being pivotally connected at its inner end to said frame and at its outer end to said wheel support about axes forming an angle with respect to each other when viewed in the side elevation of said vehicle of greater than 5 degrees.

54. In a motor vehicle, in combination, a frame, a road wheel at one side of said frame, a wheel support rotatably supporting said wheel, and a pair of vertically spaced suspension structures extending between said frame and said wheel support, one of said suspension structures being pivotally connected at its inner end to said frame and at its outer end to said wheel support about axes forming an angle with respect to each other when viewed in the side elevation of said vehicle within the range of 5 degrees to 45 degrees.

55. In a motor vehicle, in combination, a frame, a road wheel at one side of said frame, a wheel support rotatably supporting said wheel, and a pair of vertically spaced suspension structures extending between said frame and said wheel support, one of said suspension structures being pivotally connected at its inner end to said frame and at its outer end to said wheel support about axes forming an angle with respect to each other when viewed in the side elevation of said vehicle of greater than 5 degrees and also when viewed in the plan view of said vehicle of greater than 5 degrees.

56. In a motor vehicle, in combination, a frame, a road wheel at one side of said frame, a wheel support rotatably supporting said wheel, and a pair of vertically spaced suspension structures extending between said frame and said wheel support, one of said suspension structures being pivotally connected at its inner end to said frame about a first axis, said one suspension structure being pivotally connected at its outer end to said wheel support about a second axis forming an angle with the horizontal as viewed in the side elevation of said vehicle of greater than 5 degrees, said first and second axes forming an angle with respect to each other when viewed in the side elevation of said vehicle of greater than 5 degrees.

57. In a motor vehicle, in combination, a frame, a road wheel, a wheel support rotatably supporting said road wheel, power transmitting means supported upon said frame, an axle shaft drivingly connecting said power transmitting means to said road wheel, a suspension arm for said road wheel pivotally connected to said frame for pivotal movement of said arm about a first axis, said suspension arm being pivotally connected to said wheel support for pivotal movement about a second axis angularly related to said first axis when viewed in the side elevation of said vehicle to steer said wheel as it moves in jounce and rebound, the magnitude of the steer angle of said wheel being given by the expression $$\text{Tan } B = \frac{\sin A \sin C}{\sqrt{\cos^2 C - \sin^2 A}}$$

where A is the angle between said first and second axes, B is the steer angle of said road wheel, and C is the jounce or rebound angle.

58. In a motor vehicle, in combination, a frame, a road wheel, a wheel support rotatably supporting said road wheel, power transmitting means supported upon said frame, an axle shaft of invariant length drivingly connecting said power transmitting means to said road wheel, a suspension arm for said road wheel for pivotal movement of said arm about a first axis, said suspension arm being pivotally connected to said wheel support for pivotal movement about a second axis angularly related to said first axis when viewed in the side elevation of said vehicle to steer said wheel as it moves in jounce and rebound, the magnitude of the steer angle of said wheel being given by the expression Net Steer Angle = Steer Angle $(F)$ − Steer Angle $(E)$ where:

$$\text{Tan Steer Angle } (F) = \sin Y \tan F$$

and $$\text{Tan Steer Angle } (E) = \frac{\cos Z \sin X}{\cos E + \sin^2 Z (1 - \cos E)} \left[ \sin E - \frac{\sin E}{\tan X}(1 - \cos E) \right]$$

in which:

$X$ = angle between Primary Axis P and ground (as viewed in the side elevation)
$Y$ = angle between Hinge Axis H and ground (as viewed in the side elevation)
$Z$ = angle between Primary Axis P and center line of vehicle (as viewed in the plan view)
$E$ = angle of rotation of suspension arm about Primary Axis P in jounce and rebound
$F$ = angle of rotation of wheel spindle support relative to suspension arm about Hinge Axis H in jounce and rebound.

59. In a motor vehicle, in combination, a frame, a road wheel at one side of said frame, a wheel support rotatably supporting said wheel, a pair of vertically spaced suspension structures extending between said frame and said wheel support and guiding said wheel during jounce and rebound movements relative to said frame, one of said suspension structures being pivotally connected at its inner end to said frame for pivotal movement of said one structure about a first axis, and said one suspension structure being pivotally connected at its outer end to said wheel support for pivotal movement about a second axis, one of said axes being inclined upwardly in a forward direction as viewed in the side elevation of said vehicle to move the center of said wheel and the instantaneous point of contact of said wheel and the ground upwardly and rearwardly in jounce and downwardly and forwardly in rebound to provide anti-squat and anti-lift characteristics respectively for said vehicle, said first and second axes being angularly related to each other as viewed in the side elevation of said vehicle to cause said second axis to swing inwardly in a forward direction in jounce as viewed in the plan view of said vehicle and outwardly in a forwardly direction in rebound as viewed in the plan view of said vehicle to provide understeer for said road wheel in vehicle roll.

References Cited by the Examiner

UNITED STATES PATENTS

| | | | |
|---|---|---|---|
| 1,944,441 | 1/34 | MacPherson | 280—96.2 |
| 2,112,981 | 4/38 | Best | 280—124 X |
| 2,153,271 | 4/39 | Paton | 267—20 X |
| 2,330,633 | 9/43 | Seyerle | 280—124 X |
| 2,334,702 | 11/43 | Newton et al. | 280—124 X |
| 2,354,219 | 7/44 | Newton et al. | 280—124 |
| 2,596,922 | 5/52 | Thoms | 267—57 X |
| 2,635,704 | 4/53 | Herreshoff | 180—73 X |
| 2,845,279 | 7/58 | Polhemus et al. | 280—96.2 |

FOREIGN PATENTS

| | | |
|---|---|---|
| 965,029 | 2/50 | France. |
| 434,311 | 4/48 | Italy. |

A. HARRY LEVY, *Primary Examiner*.

PHILIP ARNOLD, *Examiner*.